(12) United States Patent
Ou et al.

(10) Patent No.: US 11,208,800 B2
(45) Date of Patent: Dec. 28, 2021

(54) METHODS AND APPARATUS FOR SHAPE TRANSFORMATION OF MULTI-LINKAGE STRUCTURE

(71) Applicant: Massachusetts Institute of Technology, Cambridge, MA (US)

(72) Inventors: Jifei Ou, Cambridge, MA (US); Sen Dai, Cambridge, MA (US); Zhao Ma, Zurich (CH); Jannik Peters, Aachen (DE); Nikolaos Vlavianos, Boston, MA (US)

(73) Assignee: MASSACHUSETTS INSTITUTE OF TECHNOLOGY, Cambridge, MA (US)

( * ) Notice: Subject to any disclaimer, the term of this patent is extended or adjusted under 35 U.S.C. 154(b) by 196 days.

(21) Appl. No.: 16/561,016

(22) Filed: Sep. 5, 2019

(65) Prior Publication Data

US 2020/0072276 A1   Mar. 5, 2020

Related U.S. Application Data

(60) Provisional application No. 62/727,407, filed on Sep. 5, 2018.

(51) Int. Cl.
*E04B 1/34* (2006.01)
*E04B 1/344* (2006.01)
*F16C 11/00* (2006.01)
*A63H 33/04* (2006.01)
(Continued)

(52) U.S. Cl.
CPC ............ *E04B 1/3441* (2013.01); *A63H 33/04* (2013.01); *E04B 1/32* (2013.01); *E04B 1/343* (2013.01); *F16C 11/00* (2013.01)

(58) Field of Classification Search
CPC .. E04B 1/32; E04B 1/344; E04B 2001/34389; A63H 33/04; F16H 21/02
See application file for complete search history.

(56) References Cited

U.S. PATENT DOCUMENTS

| 207,346 A * | 8/1878 | Clow ................ A63H 33/06 446/114 |
| 1,541,004 A * | 6/1925 | Gracebel ............... G09B 17/00 434/160 |

(Continued)

OTHER PUBLICATIONS

Gatt, R., et al., Hierarchical Auxetic Mechanical Metamaterials; published in Scientific Reports vol. 5, Article 8395 (2015), Feb. 2015.

(Continued)

*Primary Examiner* — Beth A Stephan
(74) *Attorney, Agent, or Firm* — Daly, Crowley, Mofford & Durkee, LLP

(57) ABSTRACT

A modular structure may comprise multiple mechanical linkages. The structure may undergo two-dimensional or three-dimensional shape transformations, such as bending, twisting, shearing, uniform scaling, and anisotropic scaling. These shape transformations may be actuated by applying force to one or more specific locations in the structure. Each of the linkages in the modular structure may comprise a four-bar linkage. The exact shape transformation that the structure undergoes may be determined by the type and location of the linkages in the structure.

14 Claims, 12 Drawing Sheets

(51) Int. Cl.
    *E04B 1/32* (2006.01)
    *E04B 1/343* (2006.01)

(56) References Cited

U.S. PATENT DOCUMENTS

| | | | | |
|---|---|---|---|---|
| 1,853,436 | A * | 4/1932 | Krause | A63F 9/088 |
| | | | | 273/155 |
| 3,977,683 | A * | 8/1976 | Tomura | A63F 9/088 |
| | | | | 273/155 |
| D281,613 | S * | 12/1985 | Kay | D19/37 |
| 4,896,165 | A * | 1/1990 | Koizumi | B64G 9/00 |
| | | | | 343/880 |
| 5,024,031 | A | 6/1991 | Hoberman | |
| 6,190,231 | B1 * | 2/2001 | Hoberman | A63F 9/0819 |
| | | | | 446/104 |
| 6,202,379 | B1 * | 3/2001 | Meguro | H01Q 1/288 |
| | | | | 52/653.1 |
| 6,273,583 | B1 * | 8/2001 | Trisler | B44C 3/12 |
| | | | | 362/121 |
| 7,100,333 | B2 * | 9/2006 | Hoberman | E04B 1/3211 |
| | | | | 135/29 |
| 7,644,721 | B2 | 1/2010 | Hoberman et al. | |
| 8,839,585 | B2 * | 9/2014 | Santiago Prowald | B64G 1/66 |
| | | | | 52/646 |
| 8,936,245 | B2 * | 1/2015 | Hopson | A63F 9/088 |
| | | | | 273/153 R |
| 10,738,458 | B2 * | 8/2020 | Matsuoka | E04H 12/187 |
| 2002/0083675 | A1 | 7/2002 | Hoberman | |
| 2017/0145681 | A1 * | 5/2017 | Alqasimi | E04B 1/3441 |

OTHER PUBLICATIONS

Grima, J., et al., Auxetic behaviour from connected different-sized squares and rectangles; published in Proceedings of the Royal Society A (2011), 467, pp. 439-458, published Aug. 2010.

Ion, A., et al., Metamaterial Mechanisms; published in Proceedings of the 29th Annual Symposium on User Interface Software and Technology, UIST '16, pp. 529-539, ACM, Oct. 2016.

Kolken, H., et al., Auxetic mechanical metamaterials; published in RSC Advances, 2017, 7, pp. 5111-5129, Royal Society of Chemistry, Jan. 17, 2017.

Saxena, K., et al.. Three Decades of Auxetics Research—Materials with Negative Poisson's Ratio: A Review; published in Advanced Engineering Materials, 2016, 18, No. 11, Jun. 21, 2016.

* cited by examiner

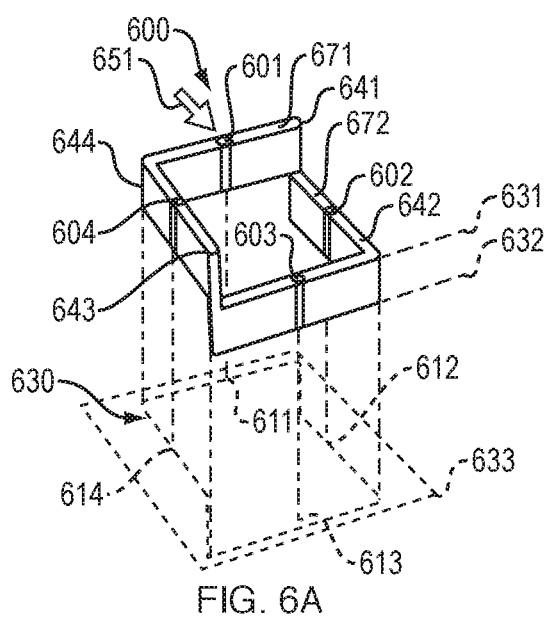
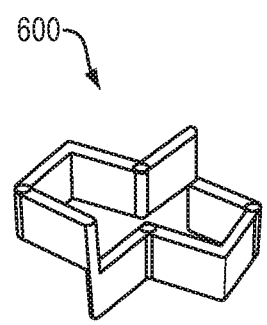
FIG. 6A
FIG. 6B
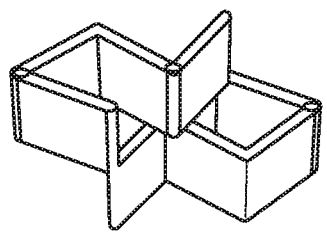
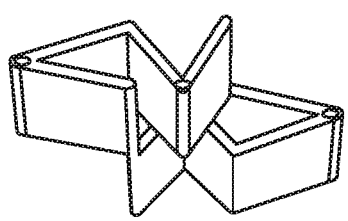
FIG. 6C
FIG. 6D

METHODS AND APPARATUS FOR SHAPE TRANSFORMATION OF MULTI-LINKAGE STRUCTURE

RELATED APPLICATIONS

This application claims the benefit of U.S. Provisional Application No. 62/727,407 filed Sep. 5, 2018 (the "Provisional").

FIELD OF TECHNOLOGY

The present invention relates generally to mechanical linkages.

SUMMARY

In illustrative implementations of this invention, a modular structure comprises multiple mechanical linkages. The structure may undergo 2D or 3D shape transformations, such as bending, twisting, shearing, uniform scaling, and anisotropic scaling. These shape transformations may be actuated by applying force (e.g., compressive force) to one or more specific locations in the structure.

Each of the linkages in the modular structure may comprise a four-bar linkage. The exact 2D or 3D shape transformation that the structure undergoes may be determined by the type and location of the linkages in the structure.

The linkages in a modular structure may comprise a single type of linkage or may comprise multiple types of linkages. For instance, the structure may include one or more of what we call "basic" linkages, "shear" linkages, "single-level uniform scaling" linkages, "twist" linkages, "bend" linkages, "bi-level uniform scaling" linkages, and "anisotropic scaling" linkages.

In some cases, the modular structure comprises a spatial sequence (or chain) of linkages. For instance, a chain may comprise bend linkages and basic linkages that spatially alternate, one after the other (e.g., bend linkage, basic linkage, bend linkage, basic linkage). This chain may undergo 3D bending when force (e.g., compressive force) is applied to certain locations in the chain. Likewise, a chain may comprise twist linkages and basic linkages that spatially alternate, one after the other (e.g., twist linkage, basic linkage, twist linkage, basic linkage). This chain may undergo 3D twisting when force (e.g., compressive force) is applied to certain location(s) in the chain.

In some cases, the modular structure comprises an array of linkages. For instance, a tessellated array of shear linkages may change its overall shape in a manner that comprises or resembles shearing, when force (e.g., compressive force) is applied to certain location(s) in the chain. Likewise, a tessellated array of single-level uniform scaling (SLUS) linkages may change its overall shape in a manner that comprises or resembles uniform scaling, when force (e.g., compressive force) is applied to certain location(s) in the chain.

The modular structure as a whole may have up to six degrees of freedom. For instance, the modular structure may undergo a shape transformation that includes translation in up to three Euclidean spatial dimensions and rotation in up to three orthogonal planes.

This invention has many practical applications. For instance, in some cases, the modular structure comprises packaging that, when force is applied to it, either: (a) changes shape to enclose a product or (b) opens to reveal a product inside. In other cases, the modular structure may be part of a robot and may perform complex, 2D or 3D robotic movements (e.g., that involve twisting or bending). In yet other cases, the modular structure may comprise a large-scale kinetic surface, such as a shape-changing facade of a building.

The position of the joints in the linkages may be parametrically tuned, to achieve shape transformations that may be precisely predicted and controlled. For instance, a computer program may model 2D or 3D shape transformations that will result from a particular assembly of linkages, depending on the type and spatial positions of the linkages in the assembly.

A linkage may be moved into many different spatial configurations. In each of these configurations, the spatial arrangement of the rigid links in the linkage, relative to each, may be different.

In some implementations, each joint in a linkage is rotatable about one, two, or three axes. For instance, in some cases, a hinge joint: (a) rotates about a longitudinal axis of the hinge; and (b) also rotates in two orthogonal directions. For example, in some cases, a hinge joint rotates about a longitudinal axis of the hinge and also undergoes what we call "in-plane" rotation and "out-plane" rotation. The "in-plane" rotation of a joint of a linkage may be in a first plane that is parallel to planar walls of a bar of the linkage, which walls are adjacent to the joint. The "out-plane" rotation of the joint may be in a second plane that is perpendicular to the first plane. In some cases, a joint is in practice slightly flexible and undergoes strain in yet other rotational directions.

In some cases, a wall of a rigid link of a linkage rotates from (a) a position in which the wall is aligned in a direction normal to a reference plane, into (b) positions in which the wall is aligned in directions that are not normal to a reference plane. For instance, in some cases, during a shape transformation, a wall of a bar of the linkage is initially vertically aligned and then becomes tilted. In some other cases, each wall of a bar of the linkage is aligned in a direction normal to a reference plane. For instance, in some cases, each wall of a bar of the linkage is vertically aligned (in a direction normal to a horizontal reference plane) throughout a range of motion of the linkage.

In some cases, a linkage is structured in such a way that, as the linkage undergoes a range of motion, two joints in the linkage collide before crossing a diagonal line between the other two joints in the linkage. In other cases, a linkage is structured in such a way that, as the linkage undergoes a range of motion, two joints in the linkage cross a diagonal line between the other two joints in the linkage without colliding.

In some cases, the linkage may be arranged in a square shape. For instance, in some cases the rigid links of a linkage are L-shaped and may be arranged in a square. In other cases, the rigid links have an irregular or curved shape that is not L-shaped, and the linkage does not have a square shape at any point in its range of motion.

In some cases, two different linkages have identical relative positions of joints throughout a range of motion, even though the shape of their rigid links is different.

The Summary and Abstract sections and the title of this document: (a) do not limit this invention; (b) are intended only to give a general introduction to some illustrative implementations of this invention; (c) do not describe all of the details of this invention; and (d) merely describe non-limiting examples of this invention. This invention may be implemented in many other ways. Likewise, the Field of Technology section is not limiting; instead it identifies, in a general, non-exclusive manner, a field of technology to which some implementations of this invention generally relate.

BRIEF DESCRIPTION OF THE DRAWINGS

FIGS. 6A, 6B, 6C and 6D show a bi-level uniform scaling linkage.

The above Figures are not necessarily drawn to scale. The above Figures show illustrative implementations of this invention, or provide information that relates to those implementations. The examples shown in the above Figures do not limit this invention. This invention may be implemented in many other ways.

DETAILED DESCRIPTION

General

In some cases, a modular structure may comprise a single type of linkage or may comprise multiple types of linkages. For instance, the structure may include one or more of what we call "basic" linkages, "shear" linkages, "single-level uniform scaling" linkages, "twist" linkages, "bend" linkages, "bi-level uniform scaling" linkages, and "anisotropic scaling" linkages. We shall now describe these types of linkages.

Basic Linkage

As used herein, a "basic linkage" means a four-bar linkage, wherein: (a) the linkage comprises four physical hinges and four physical, rigid links; and (b) in a configuration of the linkage, the four hinges are located at midpoints of four sides of a square, which square is defined by edges of the rigid links. In some use scenarios, a basic linkage is a planar linkage throughout at least part of its range of motion.

FIGS. 1A-1F show a basic linkage 100, in an illustrative implementation of this invention. Basic linkage 100 is a four-bar linkage that comprises four rigid links 141, 142, 143, 144 and four hinges 101, 102, 103, 104.

Basic linkage 100 may change shape as relative positions of its rigid links change. This is illustrated by the sequence of FIGS. 1A-1C and the sequence of FIGS. 1D-1F, which show changes in configuration of basic linkage 100.

Figure 1A:
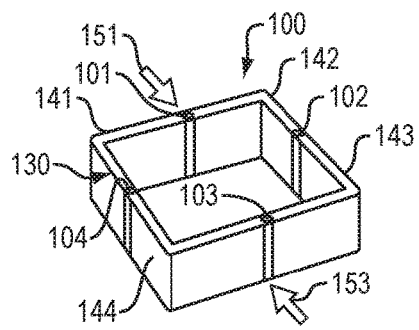
FIGS. 1A, 1B, 1C, 1D, 1E and 1F show a basic linkage.
Figure 1B:
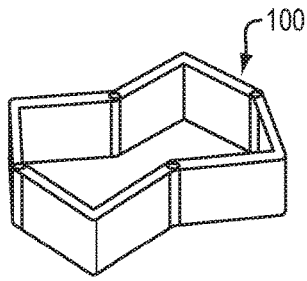
Figure 1C:
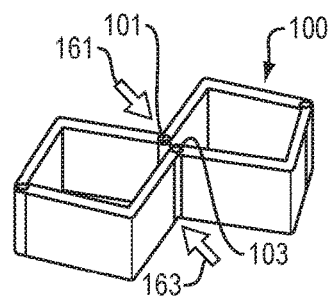
Figure 1D:
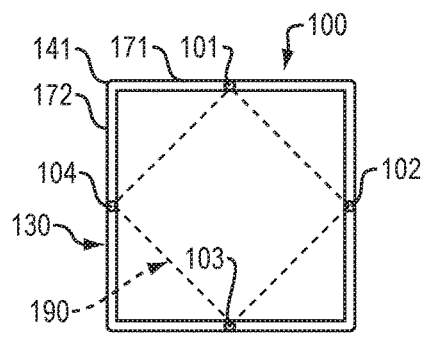

In the configuration of basic linkage 100 that is shown in FIGS. 1A and 1D: (a) a first square 130 is defined by rigid links 141, 142, 143, 144; (b) hinge 101 is located at the midpoint of a first side of first square 130; (c) hinge 102 is located at the midpoint of a second side of first square 130; (d) hinge 103 is located at the midpoint of a third side of first square 130; and (e) hinge 104 is located at the midpoint of a fourth side of first square 130.

In the configuration of basic linkage 100 which is shown in FIGS. 1A and 1C, hinges 101, 102, 103, 104 are located at the vertices of a second square 190. This second square 190 is a geometric square that is inscribed in the first square 130.

The rigid links 141, 142, 143, 144 of basic linkage 100 are identical to each other in shape. Each of these rigid links 141, 142, 143, 144 is L-shaped and includes two arms of equal length. For instance: (a) rigid link 141 includes a first arm 171 and a second arm 172; and (b) first arm 171 is equal in length to second arm 172.

Figure 1E:
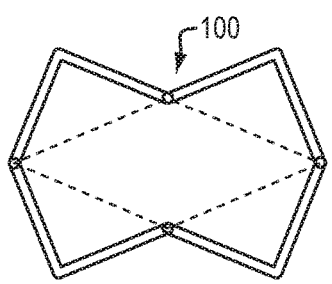
Figure 1F:
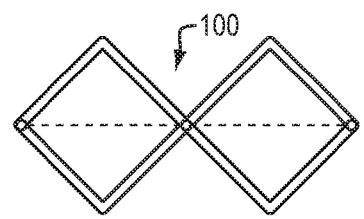

The sequence of FIGS. 1A, 1B and 1C (in that order) and the sequence of FIGS. 1D, 1E and 1F (in that order) show the basic linkage changing shape. In each case, this shape transformation: (a) may be actuated by compressing the array at certain point(s); and (b) may be reversed by applying an opposite force. Here are two non-limiting examples: (1) In FIG. 1A, this shape transformation may be initiated by exerting force: (a) on hinge 101 in direction 151; (b) on hinge 103 in direction 153; or (c) on hinges 101 and 103 in directions 151 and 153, respectively. (2) In FIG. 1C, the reverse shape transformation may be initiated, by exerting force: (a) on hinge 101 in direction 161; (b) on hinge 103 in direction 163; or (c) on hinges 101 and 103 in directions 161 and 163, respectively.

Shear Linkage

As used herein, a "shear linkage" means a four-bar linkage, wherein: (a) the linkage comprises four physical hinges and four physical, rigid links; and (b) in a configuration of the linkage (i) a first square is defined by edges of the rigid links, (ii) a second square is inscribed in the first square, (iii) the hinges are vertices of the second square, and (iv) none of the hinges are located at a midpoint of a side of the first square. In some use scenarios, a shear linkage is a planar linkage throughout at least part of its range of motion.

FIGS. 2A-2F show a shear linkage 200, in an illustrative implementation of this invention. Shear linkage 200 is a four-bar linkage that comprises four rigid links 241, 242, 243, 244 and four hinges 201, 202, 203, 204.

Shear linkage 200 may change shape as relative positions of its rigid links change. This is illustrated by the sequence of FIGS. 2A-2C and the sequence of FIGS. 2D-2F, which show changes in configuration of shear linkage 200.

Figure 2A:
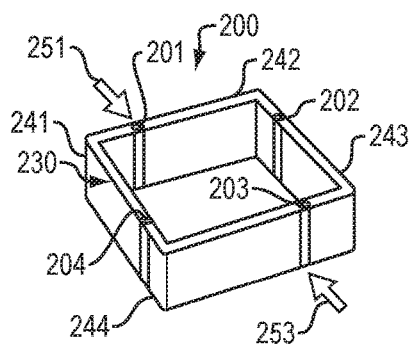
FIGS. 2A, 2B, 2C, 2D, 2E and 2F show a shear linkage.
Figure 2B:
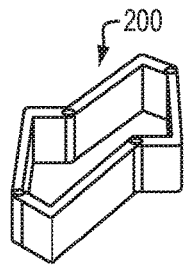
Figure 2C:
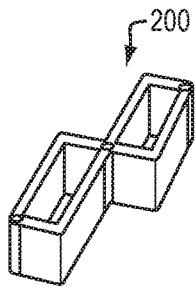
Figure 2D:
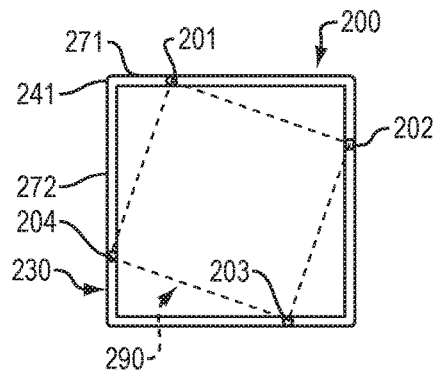

In the configuration of shear linkage 200 shown in FIGS. 2A and 2D: (a) a first square 230 is defined by rigid links 241, 242, 243, 244; (b) a second square 290 is inscribed in first square 230; (c) hinges 201, 202, 203, 204 are vertices of second square 290; and (d) hinges 201, 202, 203, 204 are each located at a point on a side of first square 230, which point is not the midpoint of the side. Specifically: (a) a first hinge 201 is located at a first vertex of second square 290 and at a point that is on, but is not the midpoint of, a first side of the first square 230; (b) a second hinge 202 is located at a second vertex of second square 290 and at a point that is on, but is not the midpoint of, a second side of first square 230; (c) a third hinge 203 is located at a third vertex of second square 290 and at a point that is on, but is not the midpoint of, a third side of first square 230, and (d) a fourth hinge 204 is located at a fourth vertex of second square 290 and at a point that is on, but is not the midpoint of, a fourth side of first square 230.

The rigid links 241, 242, 243, 244 of shear linkage 200 are identical to each other in shape. Each of these rigid links 241, 242, 243, 244 is L-shaped and includes two arms of unequal length. For instance: (a) rigid link 241 includes a first arm 271 and a second arm 272; and (b) first arm 271 is shorter than second arm 272.

Figure 2E:
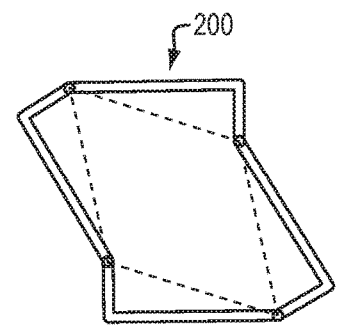
Figure 2F:
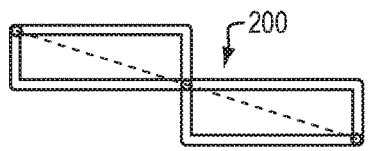

The sequence of FIGS. 2A, 2B and 2C (in that order) and the sequence of FIGS. 2D, 2E and 2F (in that order) show the shear linkage changing shape, by shearing. In each case, this shearing: (a) may be actuated by compressing the shear linkage at certain point(s); and (b) may be reversed by applying an opposite force. Here is a non-limiting example: In FIG. 2A, this shearing may be initiated by exerting force: (a) on hinge 201 in direction 251; (b) on hinge 203 in direction 253; or (c) on hinges 201 and 203 in directions 251 and 253, respectively.

Single-Level Uniform Scaling Linkage

As used herein, a "single-level uniform scaling linkage" or "SLUS linkage" means a four-bar linkage, wherein: (a) the linkage comprises four physical hinges and four physical, rigid links; and (b) in a configuration of the linkage (i) a first square is defined by edges of the rigid links, (ii) a geometric rectangle which is not a square is inscribed in the first square, and (iii) the four hinges are located at vertices of the rectangle. In some use scenarios, a SLUS linkage is a planar linkage throughout at least part of its range of motion.

FIGS. 3A-3F show a SLUS linkage 300, in an illustrative implementation of this invention. SLUS linkage 300 is a four-bar linkage that comprises four rigid links 341, 342, 343, 344 and four hinges 301, 302, 303, 304.

SLUS linkage 300 may change shape as relative positions of its rigid links change. This is illustrated by the sequence of FIGS. 3A-3C and the sequence of FIGS. 3D-3F, which show changes in configuration of SLUS linkage 300.

Figure 3A:
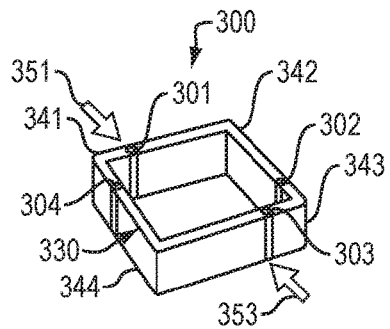
FIGS. 3A, 3B, 3C, 3D, 3E and 3F show a single-level uniform scaling linkage.
Figure 3B:
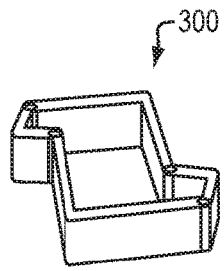
Figure 3C:
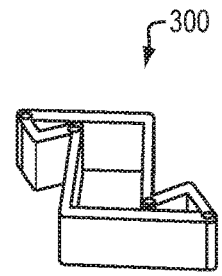
Figure 3D:
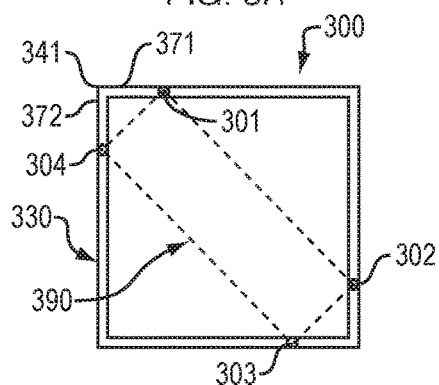

In the configuration of SLUS linkage 300 shown in FIGS. 3A and 3D: (a) a square 330 is defined by rigid links 341, 342, 343, 344; (b) a geometric rectangle 390, which is not a square, is inscribed in square 330; (c) hinges 301, 302, 303, 304 are vertices of rectangle 390; and (d) hinges 301, 302, 303 and 304 are located on the first, second, third, and fourth sides, respectively, of square 330.

The rigid links 341, 342, 343, 344 of the SLUS linkage are identical to each other in shape. Each of these rigid links 341, 342, 343, 344 is L-shaped and includes two arms of equal length. For instance: (a) rigid link 341 includes a first arm 371 and a second arm 372; and (b) first arm 371 is equal in length to the second arm 372.

Figure 3E:
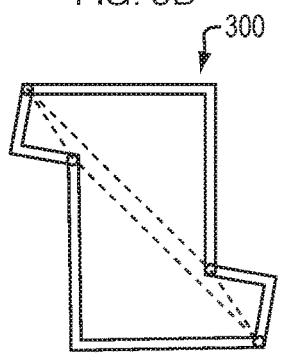
Figure 3F:
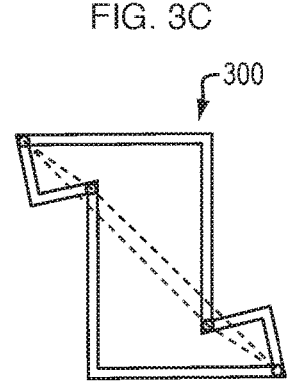

The sequence of FIGS. 3A, 3B and 3C (in that order) and the sequence of FIGS. 3D, 3E and 3F (in that order) show the SLUS linkage changing shape, by uniformly scaling. In each case, this uniform scaling: (a) may be actuated by compressing the SLUS linkage at certain point(s); and (b) may be reversed by applying an opposite force. Here is a non-limiting example: In FIG. 3A, this uniform scaling may be initiated by exerting force: (a) on hinge 301 in direction 351; (b) on hinge 303 in direction 353; or (c) on hinges 301 and 303 in directions 351 and 353, respectively.

Twist Linkage

As used herein, a "twist linkage" means a four-bar linkage, wherein: (a) the linkage comprises four physical joints and four physical, rigid links; and (b) in a configuration of the linkage (i) each of the four joints intersects a midpoint of a side of a square, which square is defined by edges of the rigid links, (ii) two of the four joints are each rotatable about an axis that is perpendicular to a plane in which the square is entirely located, and (iii) the other two of the four joints are each rotatable about an axis that has an orthogonal projection, of non-zero length, onto the plane, which projection is parallel to a side of the square.

Figure 4A:
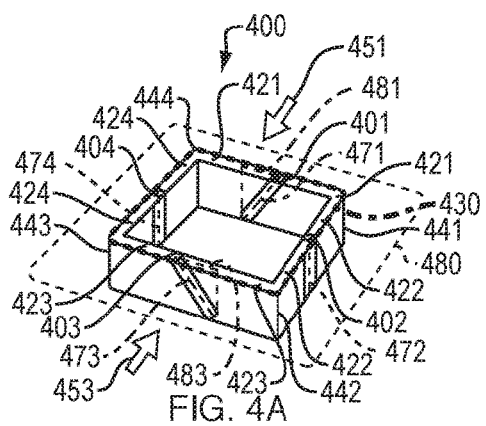
FIGS. 4A, 4B, and 4C show a twist linkage.
Figure 4B:
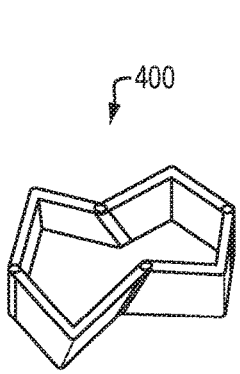
Figure 4C:
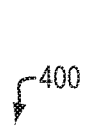

FIGS. 4A-4C show a twist linkage 400, in an illustrative implementation of this invention. Twist linkage 400 is a four-bar linkage that comprises four rigid links 441, 442, 443, 444 and four hinges 401, 402, 403, 404.

Twist linkage 400 may change shape as relative positions of its rigid links change. This is illustrated by the sequence of FIGS. 4A-4C, which shows changes in configuration of twist linkage 400.

In the configuration of twist linkage 400 shown in FIG. 4A: (a) a square 430 is defined by rigid links 441, 442, 443, 444; (b) joint 401 intersects the midpoint of a first side 421 of square 430; (c) joint 402 intersects the midpoint of a second side 422 of square 430; (d) joint 403 intersects the midpoint of a third side 423 of square 430; and (e) joint 404 intersects the midpoint of a fourth side 424 of square 430.

In the configuration of twist linkage 400 shown in FIG. 4A: (a) square 430 is located entirely in plane 480; (b) joints 402 and 404 are located on opposite sides of square 430; (c) joint 402 is rotatable about an axis 472 that is perpendicular to plane 480; (d) joint 404 is rotatable about an axis 474 that is perpendicular to plane 480; (e) joints 401 and 403 are located on opposite sides of square 430; (f) joint 401 is rotatable about an axis 471 that has an orthogonal projection 481, of non-zero length, onto plane 480, which projection 481 is parallel to the first side 421 of square 430; and (g) joint 403 is rotatable about an axis 473 that has an orthogonal projection 483, of non-zero length, onto plane 480, which projection 483 is parallel to the third side 423 of square 430.

For instance, in FIG. 4A, if plane 480 is horizontal, then: (a) joints 402 and 404 are each rotatable about a vertical axis; (b) joint 401 is rotatable about non-vertical axis 471 which is tilted in such a way that the horizontal component of its tilt is parallel to the first side 421 of square 430; and (c) joint 403 is rotatable about non-vertical axis 473 which is tilted in such a way that the horizontal component of its tilt is parallel to the third side 423 of square 430.

The rigid links 441, 442, 443, 444 of twist linkage 400 are identical to each other in shape. Each of these rigid links 441, 442, 443, 444 is L-shaped and includes two arms of equal length.

In some implementations, in a configuration of a twist linkage: (a) the twist linkage comprises four joints and four rigid hinges; (b) two joints in the twist linkage are each rotatable about an axis that is vertical; and (c) the other two joints in the twist linkage are each neighbors of planar, vertical walls of the twist linkage and are each rotatable about an axis that is not vertical but that is parallel to these planar, vertical walls. For instance, in the configuration of twist linkage 400 shown in FIG. 4A: (a) joint 401 is rotatable about an axis 471 that is not vertical but that is parallel to planar, vertical walls of side 421; (b) joint 402 is rotatable about an axis 472 that is vertical; (c) joint 403 is rotatable about an axis 473 that is not vertical but that is parallel to planar, vertical walls of side 423; and (d) joint 404 is rotatable about an axis 474 that is vertical.

The sequence of FIGS. 4A, 4B and 4C (in that order) shows the twist linkage changing shape, by twisting. This twisting: (a) may be actuated by compressing the twist linkage at certain point(s); and (b) may be reversed by applying an opposite force. Here is a non-limiting example:

In FIG. 4A, this twisting may be initiated by exerting force: (a) on joint 401 in direction 451; (b) on joint 403 in direction 453; or (c) on joints 401 and 403 in directions 451 and 453, respectively.

Bend Linkage

As used herein, a "bend linkage" means a four-bar linkage, wherein: (a) the linkage comprises four physical joints and four physical, rigid links; and (b) in a configuration of the linkage (i) each of the four joints intersects a midpoint of a side of a square, which square is defined by edges of the rigid links, (ii) two of the joints are each rotatable about an axis that is perpendicular to a plane in which the square is entirely located, and (iii) the other two of the four joints are each rotatable about an axis that has an orthogonal projection, of non-zero length, onto the plane, which projection is perpendicular to a side of the square.

Figure 5A:
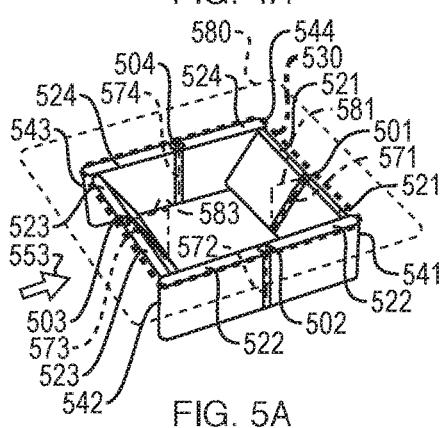
FIGS. 5A, 5B, and 5C show a bend linkage.
Figure 5B:
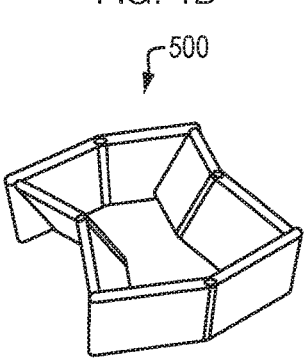
Figure 5C:
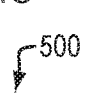

FIGS. 5A-5C show a bend linkage 500, in an illustrative implementation of this invention. Bend linkage 500 is a four-bar linkage that comprises four rigid links 541, 542, 543, 544 and four hinges 501, 502, 503, 504.

Bend linkage 500 may change shape as relative positions of its rigid links change. This is illustrated by the sequence of FIGS. 5A-5C, which shows changes in configuration of bend linkage 500.

In the configuration of twist linkage 500 shown in FIG. 5A: (a) a square 530 is defined by rigid links 541, 542, 543, 544; (b) joint 501 intersects the midpoint of a first side 521 of square 530; (c) joint 502 intersects the midpoint of a second side 522 of square 530; (d) joint 503 intersects the midpoint of a third side 523 of square 530; and (e) joint 504 intersects the midpoint of a fourth side 521 of square 530.

In the configuration of twist linkage 500 shown in FIG. 5A: (a) square 530 is located entirely in plane 580; (b) joints 502 and 504 are located on opposite sides of square 530; (c) joint 502 is rotatable about an axis 572 that is perpendicular to plane 580; (d) joint 504 is rotatable about an axis 574 that is perpendicular to plane 580; (e) joints 501 and 503 are located on opposite sides of square 530; (f) joint 501 is rotatable about an axis 571 that has an orthogonal projection 581, of non-zero length, onto plane 580, which projection 581 is perpendicular to the first side 521 of square 530; and (g) joint 503 is rotatable about an axis 573 that has an orthogonal projection 583, of non-zero length, onto plane 580, which projection 583 is perpendicular to the third side 523 of square 530.

For instance, in FIG. 5A, if plane 580 is horizontal, then: (a) joints 502 and 504 are each rotatable about a vertical axis; (b) joint 501 is rotatable about non-vertical axis 571 which is tilted in such a way that the horizontal component of its tilt is perpendicular to the first side 521 of square 530; and (c) joint 503 is rotatable about non-vertical axis 573 which is tilted in such a way that the horizontal component of its tilt is perpendicular to the third side 523 of square 530.

The rigid links 551, 542, 543, 544 of bend linkage 500 are identical to each other in shape. Each of these rigid links 541, 542, 543, 544 is L-shaped and includes two arms of equal length.

In some cases, in a configuration of a bend linkage: (a) the bend linkage comprises four joints and four rigid hinges; (b) two of the joints are rotatable about vertical axes, and (c) the other two joints are each neighbors of planar, non-vertical walls of the bend linkage and are each rotatable about a non-vertical axis that is parallel to these planar, non-vertical walls. For instance, in the configuration of bend linkage 500 shown in FIG. 5A: (a) the planar walls of sides 522 and 524 are vertical; (b) joints 502 and 504 are rotatable about vertical axes 572 and 574, respectively; (c) the planar walls of sides 521 and 523 are not vertical; (d) joint 501 is rotatable about an axis 571 that is not vertical but that is parallel to planar, non-vertical walls of side 521; and (e) joint 503 is rotatable about an axis 573 that is not vertical but that is parallel to planar, non-vertical walls of side 523.

The sequence of FIGS. 5A, 5B and 5C (in that order) shows the bend linkage changing shape, by bending. This bending: (a) may be actuated by compressing the bend linkage at certain point(s); and (b) may be reversed by applying an opposite force. Here is a non-limiting example: In FIG. 5A, this bending may be initiated by exerting force on joint 503 in direction 553.

Bi-Level Uniform Scaling Linkage

As used herein, a "bi-level uniform scaling linkage" or "BLUS linkage" means a four-bar linkage, wherein: (a) the linkage comprises four physical hinges and four physical, rigid links; and (b) in a configuration of the linkage, (i) each of the hinges is rotatable about a vertical axis, (ii) a first pair of the hinges is located on a first vertical level and a second pair of the hinges is located on a second vertical level, (iii) an orthogonal projection, unto a horizontal plane, of edges of the rigid links defines a square, and (iv) orthogonal projections of the four hinges onto the horizontal plane are each located at a midpoint of a side of the square.

FIGS. 6A-6D show a BLUS linkage 600, in an illustrative implementation of this invention. BLUS linkage 600 is a four-bar linkage that comprises four rigid links 641, 642, 643, 644 and four hinges 601, 602, 603, 604.

BLUS linkage 600 may change shape as relative positions of its rigid links change. This is illustrated by the sequence of FIGS. 6A-6C, which shows changes in configuration of BLUS linkage 600.

In the configuration of BLUS linkage 600 that is shown in FIG. 6A: (a) hinges 601, 602, 603, and 604 are rotatable about vertical axes 671, 672, 673, and 674, respectively; (b) a first pair of the hinges 602, 603 is located on a first vertical level 632 and a second pair of the hinges 601, 604 is located on a second vertical level 631, (c) an orthogonal projection, unto a horizontal plane 633, of edges of the rigid links defines a square 630, (d) an orthogonal projection of hinge 601 onto horizontal plane 633 is located at midpoint 611 of a first side of square 630, (e) an orthogonal projection of hinge 602 onto horizontal plane 633 is located at midpoint 612 of a second side of square 630, (f) an orthogonal projection of hinge 603 onto horizontal plane 633 is located at midpoint 613 of a third side of square 630, and (g) an orthogonal projection of hinge 604 onto horizontal plane 633 is located at midpoint 614 of a fourth side of square 630.

The rigid links 641, 642, 643, 644 of BLUS linkage 600 are identical to each other in shape. Each of these rigid links 641, 642, 643, 644 is L-shaped and includes two arms of equal length.

The sequence of FIGS. 6A, 6B, 6C and 6D (in that order) shows the BLUS linkage changing shape, by uniformly scaling. This uniform scaling: (a) may be actuated by compressing the BLUS linkage at certain point(s); and (b) may be reversed by applying an opposite force. Here is a non-limiting example: In FIG. 6A, this uniform scaling may be initiated by exerting force on hinge 601 in direction 651.

Anisotropic Scaling Linkage

As used herein, an "anisotropic scaling linkage" means a four-bar linkage, wherein: (a) the linkage comprises four physical hinges and four physical, rigid links; (b) the four rigid links are identical in shape; and (c) each of the rigid links comprises a vertex and two arms that meet at the vertex, in such a way that the vertex and two arms form an obtuse angle. In some use scenarios, an anisotropic scaling linkage is a planar linkage throughout at least part of its range of motion.

FIGS. 7A-7G show an anisotropic scaling linkage 700, in an illustrative implementation of this invention. Anisotropic scaling linkage 700 is a four-bar linkage that comprises four rigid links 741, 742, 743, 744 and four hinges 701, 702, 703, 704.

Anisotropic scaling linkage 700 may change shape as relative positions of its rigid links change. This is illustrated by the sequence of FIGS. 7A-7G, which shows changes in configuration of anisotropic scaling linkage 700.

Figure 7A:
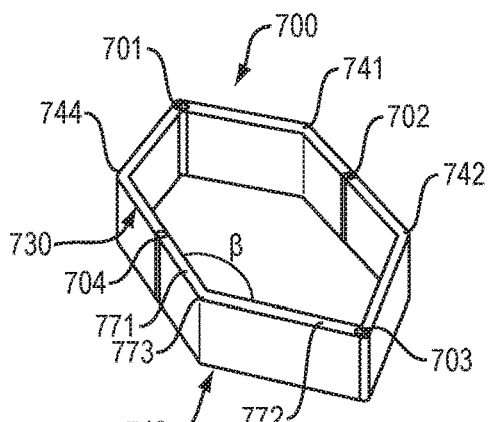
FIGS. 7A, 7B, 7C, 7D, 7E, 7F, and 7G show an anisotropic scaling linkage.
Figure 7B:
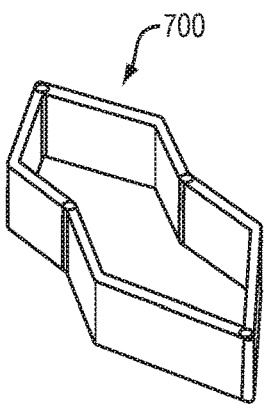
Figure 7C:
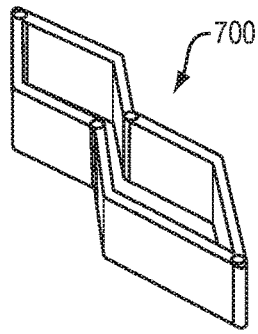
Figure 7D:
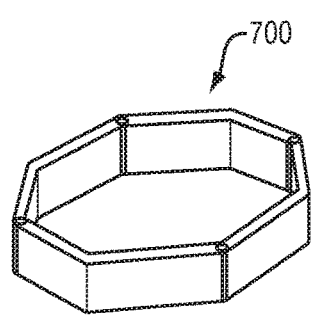
Figure 7E:
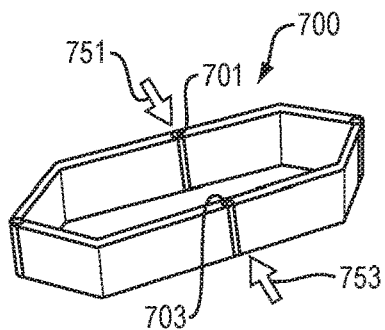
Figure 7F:
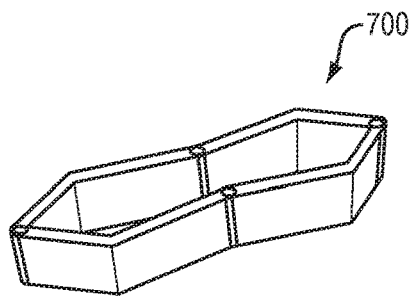
Figure 7G:
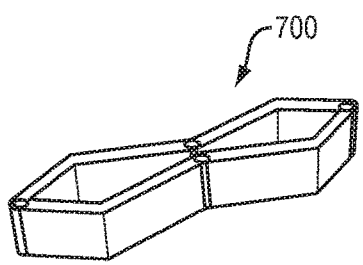

In the configurations of anisotropic scaling linkage 700 that are shown in FIGS. 7A, 7D and 7E, a hexagon 730 is defined by rigid links 741, 742, 743, 744.

The rigid links 741, 742, 743, 744 of anisotropic scaling linkage 700 are identical to each other in shape. Each of these rigid links 741, 742, 743, 744 comprises a vertex and two arms that meet at the vertex, in such a way that the vertex and two arms form an obtuse angle. For instance (a) rigid link 743 includes a vertex 773 and two arms 771, 772; and (b) the two arms 771, 772 meet at vertex 773 and form obtuse angle β.

The sequence of FIGS. 7D, 7E, 7F and 7G (in that order) shows the anisotropic scaling linkage changing shape, by scaling in an anisotropic manner. This anisotropic scaling: (a) may be actuated by compressing the anisotropic scaling linkage at certain point(s); and (b) may be reversed by applying an opposite force. Here is a non-limiting example: In FIG. 7E, this anisotropic scaling may be continued by exerting force: (a) on hinge 701 in direction 751; (b) on hinge 703 in direction 753; or (c) on hinges 701 and 703 in directions 751 and 753, respectively.

The sequence of FIGS. 7A, 7B, and 7C (in that order) shows the anisotropic scaling linkage undergoing a second shape transformation. Again, this shape transformation: (a) may be actuated by compressing the anisotropic scaling linkage at certain point(s); and (b) may be reversed by applying an opposite force.

Multi-Linkage Bending Structure

In some implementations, a structure: (a) includes bend linkages and other types of linkages; and (b) bends when force is applied to the structure at one or more specific locations.

Figure 8A:
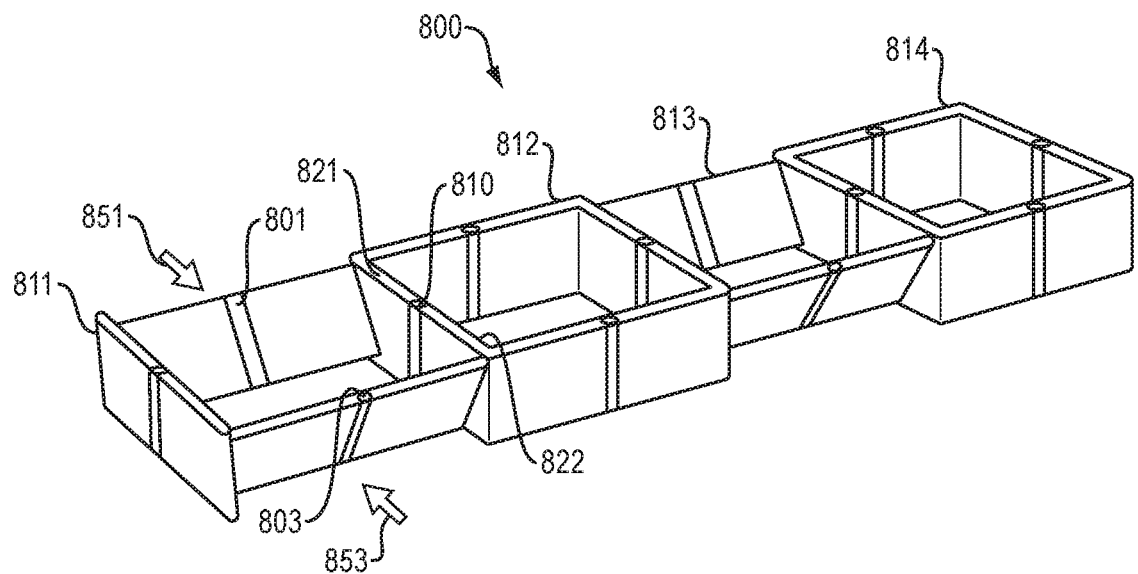
FIGS. 8A and 8B show a multi-linkage structure that bends.
Figure 8B:
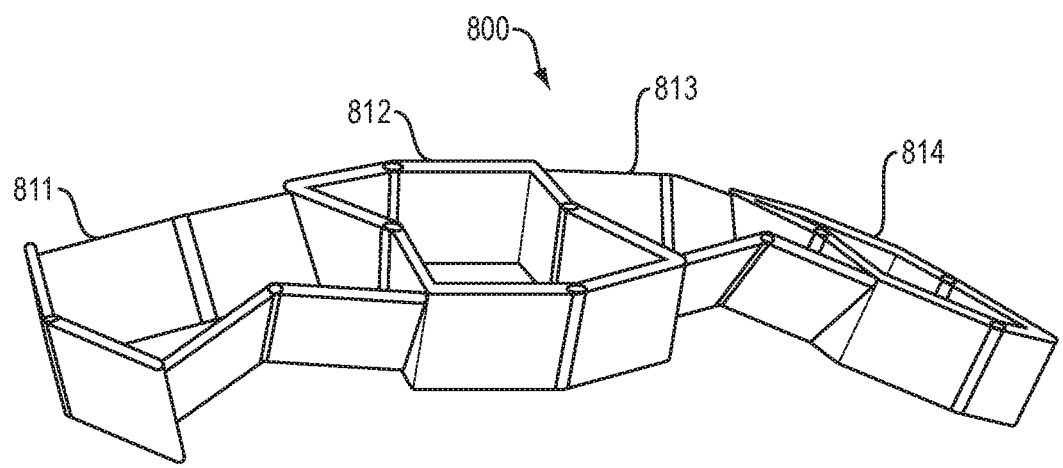

FIGS. 8A and 8B show a multi-linkage structure 800 that bends. In the configuration of structure 800 that is shown in FIG. 8A, bend linkages alternate with basic linkages along a spatial dimension. Specifically, structure 800 comprises a spatial sequence of a bend linkage 811, basic linkage 812, bend linkage 813, and basic linkage 814 (in that order).

In structure 800, each pair of neighboring linkages shares a hinge and two arms. For instance, bend linkage 811 and basic linkage 812: (a) are neighbors; and (b) share hinge 810, arm 821, and arm 822. Each of the shared arms is part of two rigid links.

In the sequence of FIGS. 8A and 8B (in that order), structure 800 changes shape, by bending. This bending: (a) may be actuated by compressing structure 800 at certain point(s); and (b) may be reversed by applying an opposite force. Here is a non-limiting example: In FIG. 8A, this bending may be initiated by exerting force: (a) on hinge 801 in direction 851; (b) on hinge 803 in direction 853; or (c) on hinges 801 and 803 in directions 851 and 853, respectively.

In FIGS. 8A and 8B, structure 800 comprises a single chain of linkages.

Alternatively, a bendable, multi-link structure may comprise a tessellated array of linkages. In each column of the array, bend linkages may alternate with basic linkage (e.g., bend linkage, basic linkage, bend linkage, basic linkage, and so on). Likewise, in each column of the array, bend linkages may alternate with basic linkage (e.g., bend linkage, basic linkage, bend linkage, basic linkage, and so on). In this array, each linkage may share hinges and arms (of rigid links) with its neighboring linkages in the array.

Multi-Linkage Twisting Structure

In some implementations, a structure: (a) includes twist linkages and other types of linkages; and (b) twists when force is applied to the structure at one or more specific locations.

Figure 9A:
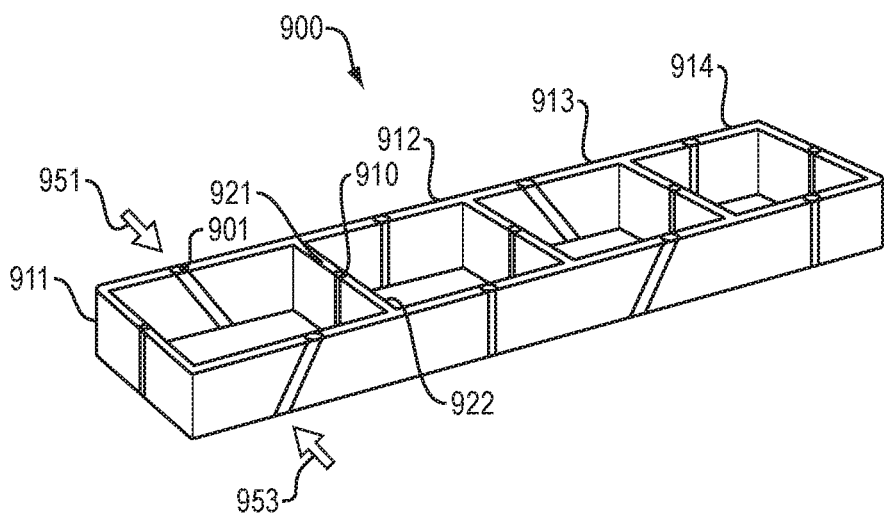
FIGS. 9A and 9B show a multi-linkage structure that twists.
Figure 9B:
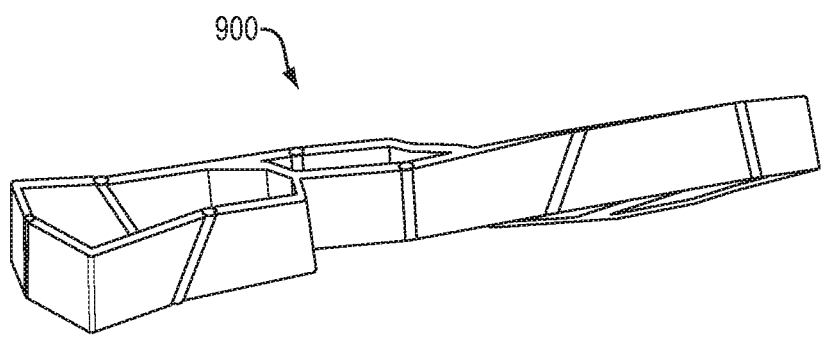

FIGS. 9A and 9B show a multi-linkage structure 900 that twists. In the configuration of structure 900 that is shown in FIG. 9A, twist linkages alternate with basic linkages along a spatial dimension. Specifically, structure 900 comprises a spatial sequence of a twist linkage 911, basic linkage 912, twist linkage 913, and basic linkage 914 (in that order).

In structure 900, each pair of neighboring linkages share a hinge and two arms. For instance, twist linkage 911 and basic linkage 912: (a) are neighbors; and (b) share hinge 910, arm 921, and arm 922. Each of the shared arms is part of two rigid links.

In the sequence of FIGS. 9A and 9B (in that order), structure 900 changes shape, by bending. This bending: (a) may be actuated by compressing structure 900 at certain point(s); and (b) may be reversed by applying an opposite force. Here is a non-limiting example: In FIG. 9A, this bending may be initiated by exerting force: (a) on hinge 901 in direction 951; (b) on hinge 903 in direction 953; or (c) on hinges 901 and 903 in directions 951 and 953, respectively.

In FIGS. 9A and 9B, structure 900 comprises a single chain of linkages.

Alternatively, a twistable, multi-link structure may comprise a tessellated array of linkages. In each column of the array, twist linkages may alternate with basic linkage (e.g., twist linkage, basic linkage, twist linkage, basic linkage, and so on). Likewise, in each column of the array, twist linkages may alternate with basic linkage (e.g., twist linkage, basic linkage, twist linkage, basic linkage, and so on). In this array, each linkage may share hinges and arms (of rigid links) with its neighboring linkages in the array.

Tessellated Array of Shear Linkages

In some implementations: (a) a structure comprises a tessellated array of shear linkages; and (b) the overall shape of the structure shears when force is applied to the structure at one or more specific locations.

Figure 10A:
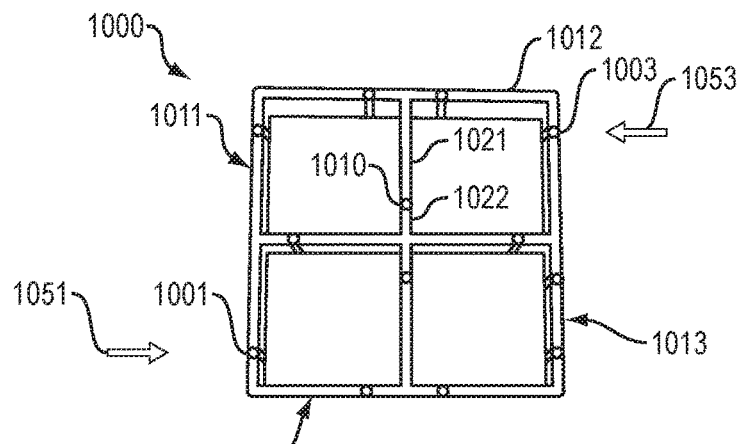
FIGS. 10A, 10B and 10C show a multi-linkage structure that shears.
Figure 10B:
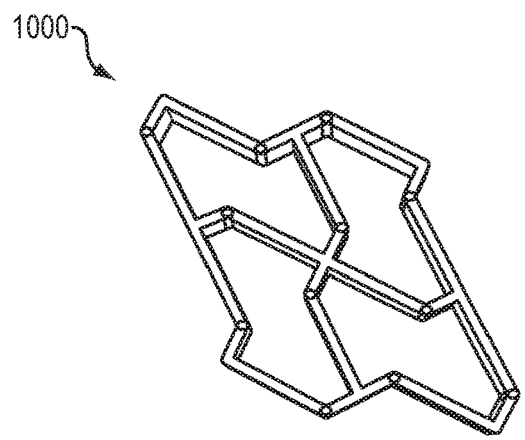
Figure 10C:
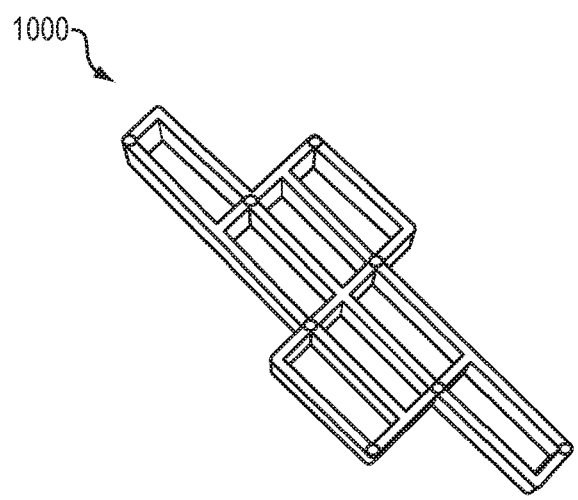

FIGS. 10A-10C show a tessellated array 1000 of shear linkages. FIGS. 12A-12D show another tessellated array 1200 of shear linkages. Array 1000 comprises four shear linkages 1011, 1012, 1013, 1014. Array 1200 comprises fifteen shear linkages.

In array 1000 and array 1200, each pair of neighboring linkages shares a hinge and two arms. For instance, shear linkage 1011 and shear linkage 1012: (a) are neighbors; and (b) share hinge 1010, arm 1021, and arm 1022. Each of these shared arms is part of two rigid links.

The sequence of FIGS. 10A, 10B and 10C (in that order) shows the overall shape of array 1000 shearing. Likewise, the sequence of FIGS. 12A, 12B, 12C and 12D (in that order) shows the overall shape of array 1200 shearing. In each case, this shearing: (a) may be actuated by compressing the array at certain point(s); and (b) may be reversed by applying an opposite force. Here is a non-limiting example: In FIG. 10A, a shape transformation (shearing) may be initiated by pressing: (a) hinge 1001 in direction 1051; (b) on hinge 1003 in direction 1053; or (c) on hinges 1001 and 1003 in directions 1051 and 1053, respectively.

Tessellated Array of Uniform Scaling Linkages

In some implementations: (a) a structure comprises a tessellated array of single-level uniform scaling (SLUS) linkages; and (b) the overall shape of the structure uniformly scales when force is applied to the structure at one or more specific locations.

Figure 11A:
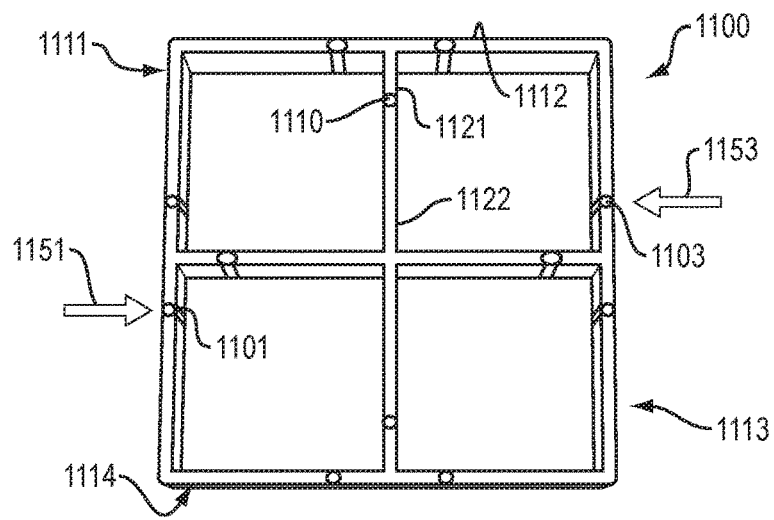
FIGS. 11A, 11B and 11C show a multi-linkage structure that uniformly scales.
Figure 11B:
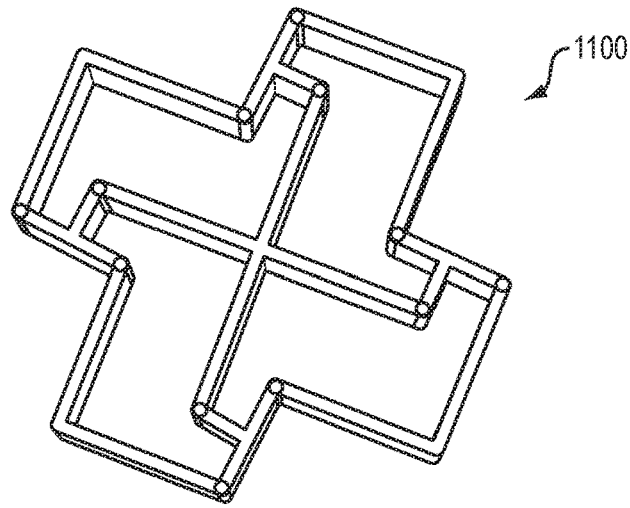
Figure 11C:
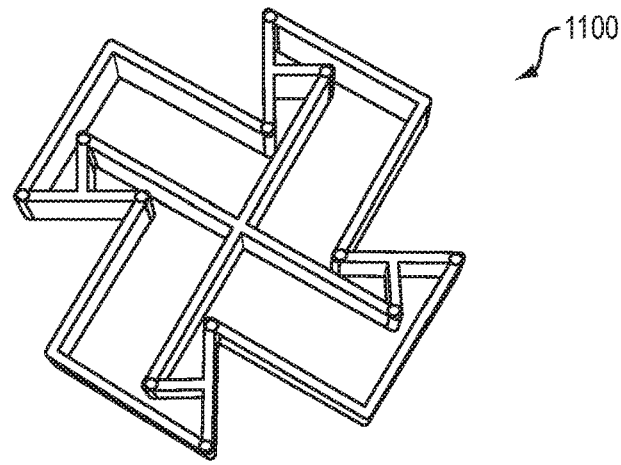
Figure 12A:
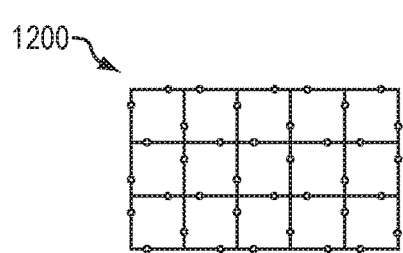
FIGS. 12A, 12B, 12C and 12D show a tessellated array of shear linkages.
Figure 12B:
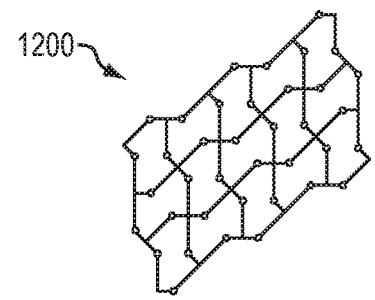
Figure 12C:
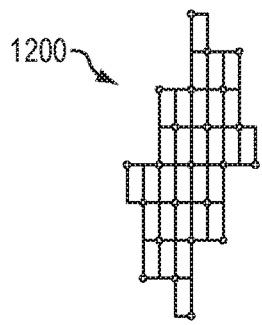
Figure 12D:
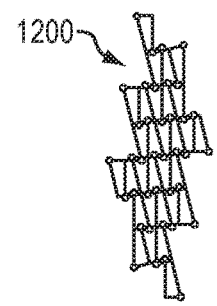
Figure 13A:
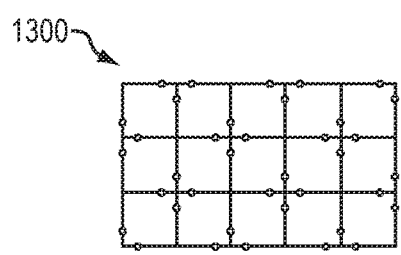
FIGS. 13A, 13B, 13C and 13D show a tessellated array of single-level uniform scaling linkages.
Figure 13B:
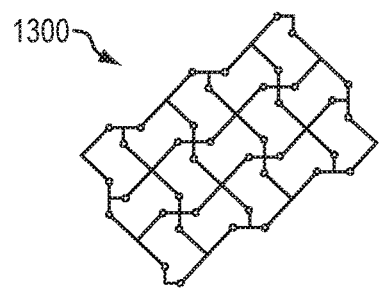
Figure 13C:
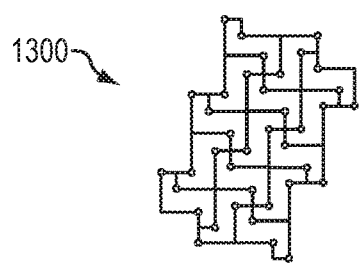
Figure 13D:
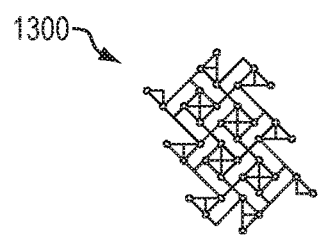

FIGS. 11A-11C show a tessellated array 1100 of SLUS linkages. FIGS. 13A-13D show another tessellated array 1300 of SLUS linkages. Array 1100 comprises four SLUS linkages 1111, 1112, 1113, 1114. Array 1300 comprises fifteen SLUS linkages.

In array 1100 and array 1300, each pair of neighboring linkages shares a hinge and two arms. For instance, SLUS linkage 1111 and SLUS linkage 1112: (a) are neighbors; and (b) share hinge 1110, arm 1121, and arm 1122. Each of these shared arms is part of two rigid links.

The sequence of FIGS. 11A, 11B and 11C (in that order) shows the overall shape of array 1000 uniformly scaling. Likewise, the sequence of FIGS. 13A, 13B, 13C, and 13D (in that order) shows the overall shape of array 1300 uniformly scaling. In each case, this uniform scaling: (a) may be actuated by compressing the array at certain point(s); and (b) may be reversed by applying an opposite force. Here is a non-limiting example: In FIG. 11A, a shape transformation (uniformly scaling) may be initiated by pressing: (a) hinge 1101 in direction 1151; (b) on hinge 1103 in direction 1153; or (c) on hinges 1101 and 1103 in directions 1151 and 1153, respectively.

Non-Square Linkages

This invention is not limited to square linkages.

In some implementations of this invention, a linkage is, in all configurations of the linkage, not square.

In FIGS. 14A, 14B, 15A and 15B, each linkage: (a) has truncated corners; and (b) thus, in all configurations of the linkage, is not square.

Figure 16:
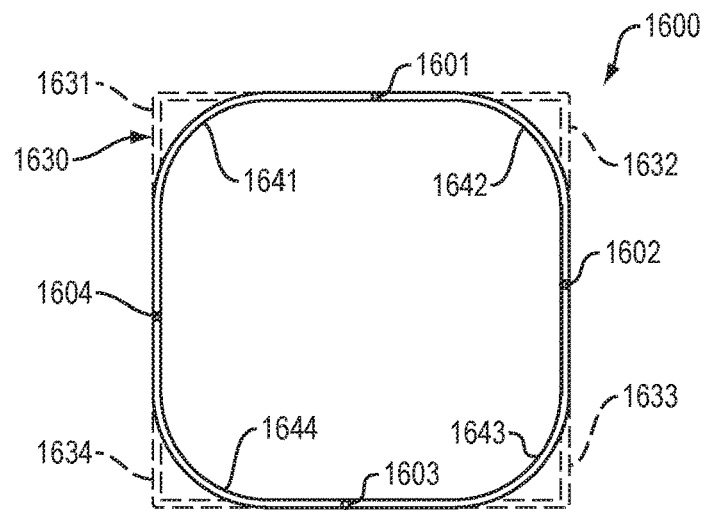
FIGS. 16, 17 and 18 show joint-matching linkages.
Figure 17:
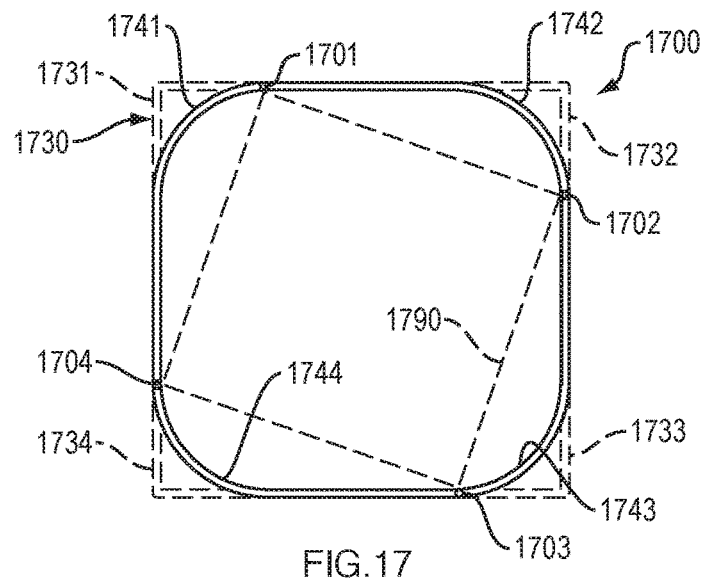
Figure 18:
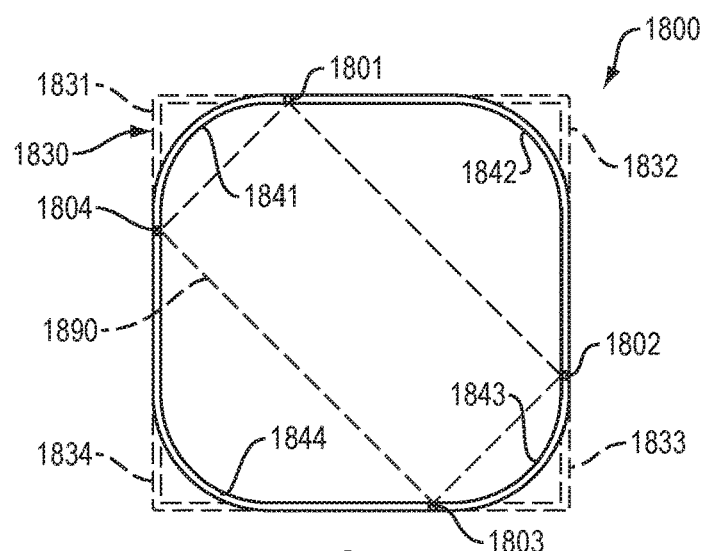

Likewise, in FIGS. 16, 17 and 18, the rigid links have curved or truncated corners. Thus, in FIGS. 16, 17 and 18, the linkages cannot be moved into a configuration in which the rigid links define a square.

Figure 14A:
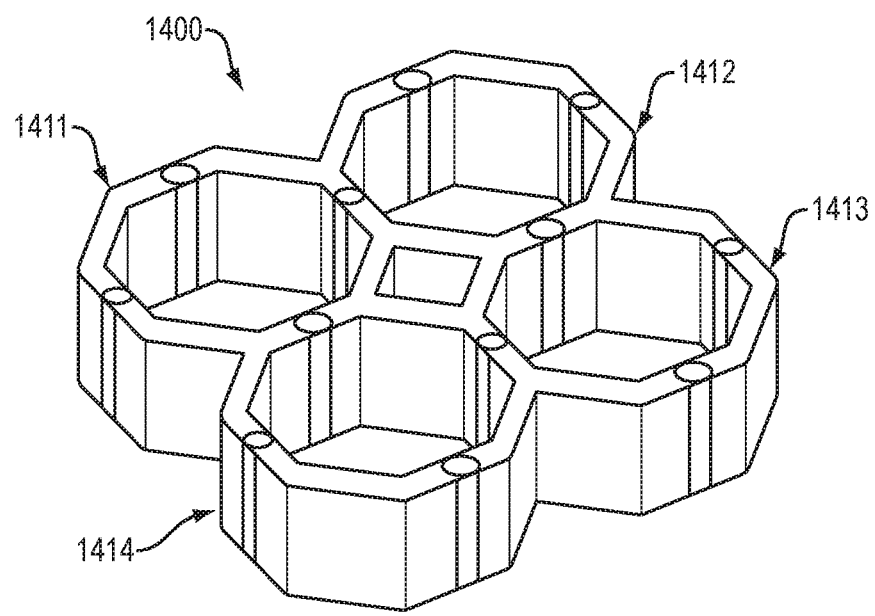
FIGS. 14A, 14B, 15A and 15B show linkages with truncated corners.
Figure 14B:
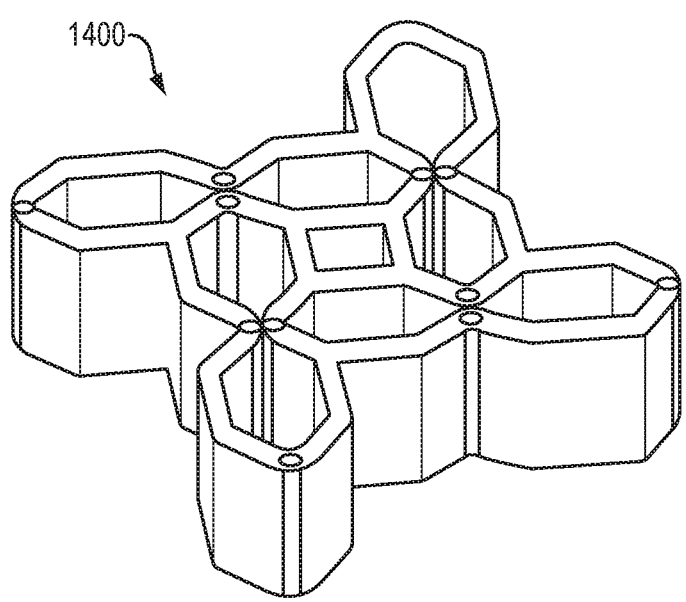

FIGS. 14A and 14B show a tessellated array 1400 that comprises four linkages 1411, 1412, 1413, 1414. These four linkages 1411, 1412, 1413, 1414 are the same as basic linkages, except that the corners of their rigid links are truncated. Put differently, these four linkages differ from a basic link only in the shape of their rigid links, not in the relative positions of their hinges.

Figure 15A:
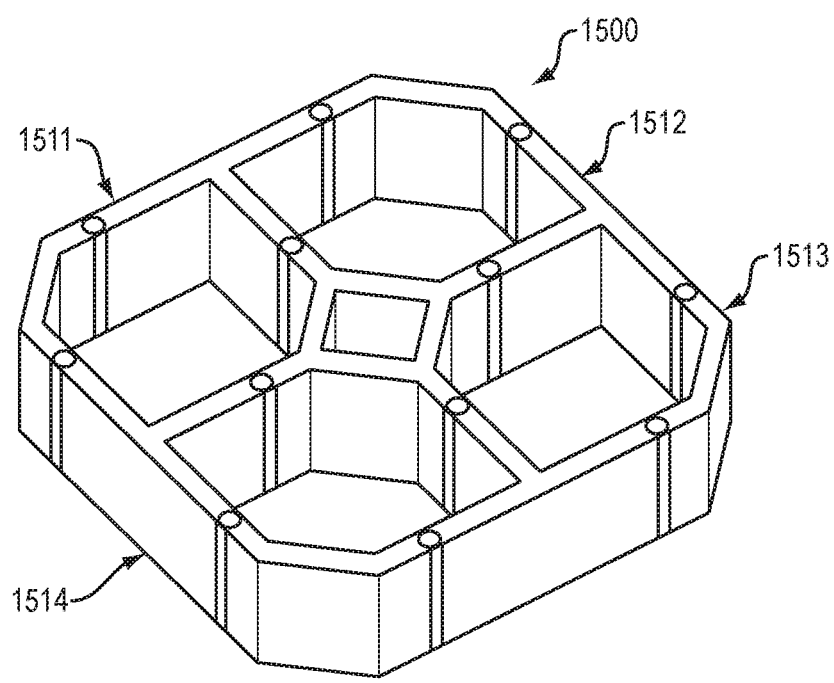
Figure 15B:
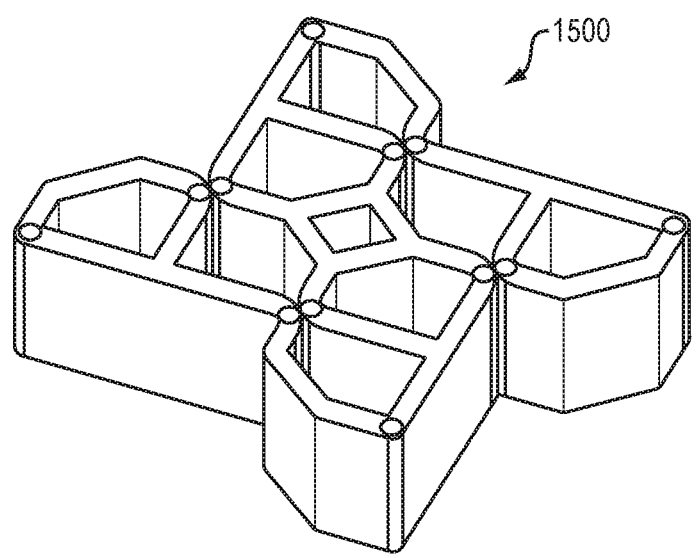

FIGS. 15A and 15B show a tessellated array 1500 that comprises four linkages 1511, 1512, 1513, 1514. These four linkages 1511, 1512, 1513, 1514 are the same as single-level uniform scaling (SLUS) linkages, except that the corners of their rigid links are truncated. Put differently, these four linkages differ from a SLUS linkage only in the shape of their rigid links, not in the relative positions of their hinges.

In tessellated arrays 1400 and 1500, each pair of neighboring linkages shares a hinge and parts of two rigid links.

The sequence of FIGS. 14A and 14B shows the overall shape of array 1400 changing shape. Likewise, the sequence of FIGS. 15A and 15B shows the overall shape of array 1500 uniformly scaling. In each case, the shape change: (a) may be actuated by compressing the array at certain point(s); and (b) may be reversed by applying an opposite force.

Joint-Matching Linkages, Generally

In some alternative implementations of this invention: (a) a linkage does not have L-shaped links and is not square in any configuration; yet (b) the linkage has—over a wide range of motion—the same relative positions of joints as does one of the linkages discussed above (e.g., basic linkage, bend linkage, twist linkage, SLUS linkage, BLUS linkage, anisotropic scaling linkage).

Joint-Matching Basic Linkage

In some cases, a linkage has—over a range of motion—the same spatial arrangements of joints as does a basic linkage.

As used herein, a "joint-matching basic linkage" or "JM basic linkage" means a linkage that is structured in such a way that the linkage has—throughout a substantial range of its motion—the same relative positions of joints as does a basic linkage.

As used herein, a "substantial range of motion" means a range of motion in which an angle formed by two rigid links (which are connected by a joint) changes by at least twenty degrees.

FIG. 16 shows an example of a JM basic linkage 1600. The rigid links 1641, 1642, 1643, 1644 in JM basic linkage 1600 are curved and do not, in any configuration, define a square. However, JM basic linkage 1600 has, throughout a substantial range of its motion, the same relative positions of joints as does a basic linkage.

JM basic linkage 1600 is a four-bar linkage that comprises four rigid links 1641, 1642, 1643, 1644 and four hinges 1601, 1602, 1603, 1604. In some use scenarios, a JM basic linkage is a planar linkage throughout at least part of its range of motion.

In the configuration of basic linkage 1600 that is shown in FIG. 16: (a) a first square 1630 would be defined by straight corners 1631, 1632, 1633, 1634 of rigid links 1641, 1642, 1643, 1644 if the rigid links were L-shaped (which they are not); (b) hinge 1601 is located at the midpoint of a first side of square 1630; (c) hinge 1602 is located at the midpoint of a second side of square 1630; (d) hinge 1603 is located at the midpoint of a third side of square 1630; and (e) hinge 1604 is located at the midpoint of a fourth side of first square 1630.

In FIG. 16, the rigid links 1641, 1642, 1643, 1644 of the basic linkage are not L-shaped. However, the four hinges 1601, 1602, 1603, 1604 are in the same position, relative to each other, as if the rigid links were L-shaped with straight corners 1631, 1632, 1633, 1634.

Joint-Matching Shear Linkage

In some implementations, a linkage has—over a range of motion—the same relative positions of joints as does a shear linkage.

As used herein, a "joint-matching shear linkage" or "JM shear linkage" means a linkage that is structured in such a way that the linkage has—throughout a substantial range of its motion—the same relative positions of joints as does a shear linkage.

FIG. 17 shows an example of a JM shear linkage 1700. The rigid links 1741, 1742, 1743, 1744 in JM shear linkage 1700 are curved and do not, in any configuration, define a square. However, JM shear linkage 1700 has, throughout a substantial range of its motion, the same relative positions of joints as does a shear linkage.

JM shear linkage 1700 is a four-bar linkage that comprises four rigid links 1741, 1742, 1743, 1744 and four hinges 1701, 1702, 1703, 1704. In some use scenarios, a JM shear linkage is a planar linkage throughout at least part of its range of motion.

In the configuration of shear linkage 1700 that is shown in FIG. 17: (a) a first square 1730 would be defined by straight corners 1731, 1732, 1733, 1734 of rigid links 1741, 1742, 1743, 1744 if the rigid links were L-shaped (which they are not); (b) a second square 1790 is inscribed in first square 1730; (c) hinges 1701, 1702, 1703, 1704 are vertices of second square 1790; and (d) hinges 1701, 1702, 1703, 1704 are each located at a point on a side of first square 1730, which point is not the midpoint of the side. Specifically: (a) a first hinge 1701 is located at a first vertex of second square 1790 and at a point that is on, but is not the midpoint of, a first side of the first square 1730; (b) a second hinge 1702 is located at a second vertex of second square 1790 and at a point that is on, but is not the midpoint of, a second side of first square 1730; (c) a third hinge 1703 is located at a third vertex of second square 1790 and at a point that is on, but is not the midpoint of, a third side of first square 1730, and (d) a fourth hinge 1704 is located at a fourth vertex of second square 1790 and at a point that is on, but is not the midpoint of a fourth side of first square 1730.

In FIG. 17, the rigid links 1741, 1742, 1743, 1744 of the shear linkage are not L-shaped. However, the four hinges 1701, 1702, 1703, 1704 are in the same position, relative to each other, as if the rigid links were L-shaped with straight corners 1731, 1732, 1733, 1734.

Joint-Matching, Single-Level Uniform Scaling Linkage

In some alternative implementations, a linkage has—over a range of motion—the same relative positions of joints as does a single-level uniform-scaling linkage (SLUS linkage).

As used herein, a "joint-matching, single-level uniform scaling linkage" or "JM SLUS linkage" means a linkage that is structured in such a way that the linkage has—throughout a substantial range of its motion—the same relative positions of joints as does a SLUS linkage.

FIG. 18 shows an example of a JM SLUS linkage 1800. The rigid links 1841, 1842, 1843, 1844 in JM SLUS linkage 1800 are curved and do not, in any configuration, define a square. However, JM SLUS linkage 1800 has, throughout a substantial range of its motion, the same relative positions of joints as does a SLUS linkage.

JM SLUS linkage 1800 is a four-bar linkage that comprises four rigid links 1841, 1842, 1843, 1844 and four hinges 1801, 1802, 1803, 1804. In some use scenarios, a JM SLUS linkage is a planar linkage throughout at least part of its range of motion.

In the configuration of SLUS linkage 1800 that is shown in FIG. 18: (a) a first square 1830 would be defined by straight corners 1831, 1832, 1833, 1834 of rigid links 1841, 1842, 1843, 1844 if the rigid links were L-shaped (which they are not); (b) a geometric rectangle 1890, which is not a square, is inscribed in square 1830; (c) hinges 1801, 1802, 1803, 1804 are vertices of rectangle 1890; and (d) hinges 1801, 1802, 1803 and 1804 are located on the first, second, third, and fourth sides, respectively, of square 1830.

In FIG. 18, the rigid links 1841, 1842, 1843, 1844 of the SLUS linkage are not L-shaped. However, the four hinges 1801, 1802, 1803, 1804 are in the same position, relative to each other, as if the rigid links were L-shaped with straight corners 1831, 1832, 1833, 1834.

Other Joint-Matching Linkages

In some implementations, other joint-matching linkages are employed, such as JM twist linkages, JM bend linkages, JM BLUS linkages, and JM anisotropic scaling linkages.

As used herein, a "joint-matching twist linkage" or "JM twist linkage" means a linkage that is structured in such a way that the linkage has—throughout a substantial range of its motion—the same relative positions of joints as does a twist linkage.

As used herein, a "joint-matching bend linkage" or "JM bend linkage" means a linkage that is structured in such a way that the linkage has—throughout a substantial range of its motion—the same relative positions of joints as does a bend linkage.

As used herein, a "joint-matching, bi-level uniform scaling linkage" or "JM BLUS linkage" means a linkage that is structured in such a way that the linkage has—throughout a substantial range of its motion—the same relative positions of joints as does a BLUS linkage.

As used herein, a "joint-matching anisotropic scaling linkage" or "JM anisotropic scaling linkage" means a linkage that is structured in such a way that the linkage has—throughout a substantial range of its motion—the same relative positions of joints as does an anisotropic scaling linkage. In some use scenarios, a JM anisotropic scaling linkage is a planar linkage throughout at least part of its range of motion.

Joint-matching linkages may be combined to form larger structures. For instance, a structure that comprises a spatial sequence of JM bend linkage, JM basic linkage, JM bend linkage and JM basic linkage (in that order) may be configured to bend when compressive force is applied at certain location(s) in the structure. Furthermore, a structure that comprises a spatial sequence of JM twist linkage, JM basic linkage, JM twist linkage and JM basic linkage (in that order) may be configured to twist when compressive force is applied at certain location(s) in the structure. Likewise, a tessellated array of JM shear linkages may change overall its shape by shearing, when compressive force is applied at certain location(s) in the array. Also, a tessellated array of JM SLUS linkages may change overall its shape by uniformly scaling, when compressive force is applied at certain location(s) in the array.

Modular Combinations of Linkages

In illustrative implementations of this invention, a modular structure comprises multiple mechanical linkages.

In some cases, the modular structure comprises multiple linkages that are all a single type of linkage, which single type is either: basic linkage, shear linkage, SLUS linkage, twist linkage, bend linkage, BLUS linkage, anisotropic scaling linkage, JM basic linkage, JM shear linkage, JM SLUS linkage, JM twist linkage, JM bend linkage, JM BLUS linkage, or JM anisotropic scaling linkage. For instance, the structure may comprise: (a) a tessellated array of shear linkages; (b) a tessellated array of SLUS linkages; (c) a tessellated array of BLUS linkages; (d) a tessellated array of anisotropic scaling linkages; (e) a tessellated array of JM shear linkages; (f) a tessellated array of JM SLUS linkages; (g) a tessellated array of JM BLUS linkages; or (h) a tessellated array of JM anisotropic scaling linkages.

In some cases, the modular structure comprises multiple linkages that are from two or more different types of linkages. For instance, the multiple linkages may include linkages from two or more of the following types of linkages: basic linkage, shear linkage, SLUS linkage, twist linkage, bend linkage, BLUS linkage, anisotropic scaling linkage, JM basic linkage, JM shear linkage, JM SLUS linkage, JM twist linkage, JM bend linkage, JM BLUS linkage, or JM anisotropic scaling linkage. For example, the multi-link structure may include: (a) both bend linkages and twist linkages; (b) both shear linkages and bend linkages; (c) both shear linkages and twist linkages; (d) both SLUS linkages and bend linkages; (e) both SLUS linkages and twist linkages; or (f) both SLUS linkages and shear linkages.

The exact 2D or 3D shape transformation that the modular structure undergoes may be determined by the type and location of the linkages in the structure.

For instance, if the modular structure comprises a chain or tessellated array of shear linkages or a chain or tessellated array of JM shear linkages, then pressing on one or more selected locations in the structure may cause the overall shape of the structure to shear.

Likewise, if the modular structure comprises a tessellated array of SLUS linkages or a tessellated array of JM SLUS linkages, then pressing on one or more selected locations in the structure may cause the overall shape of the structure to uniformly scale.

Likewise, if the modular structure comprises a tessellated array of BLUS linkages or a tessellated array of JM BLUS linkages, then pressing on one or more selected locations in the structure may cause the overall shape of the structure to uniformly scale.

Likewise, if the modular structure comprises a tessellated array of anisotropic scaling linkages or a tessellated array of JM anisotropic scaling linkages, then pressing on one or more selected locations in the structure may cause the overall shape of the structure to scale in an anisotropic manner.

Likewise, if the modular structure comprises a chain or tessellated array that includes basic linkages and bend linkages, then pressing on one or more selected locations in the structure may cause the overall shape of the structure to undergo 3D bending.

Likewise, if the modular structure comprises a chain or tessellated array that includes basic linkages and twist linkages, then pressing on one or more selected locations in the structure may cause the overall shape of the structure to undergo 3D twisting.

Likewise, if the modular structure comprises a chain or tessellated array that includes basic linkages, bend linkages and twist linkages, then pressing on one or more selected locations in the structure may cause the overall shape of the structure to both bend and twist in three dimensions.

Likewise, if the modular structure comprises a chain or tessellated array that includes shear linkages and bend linkages, then pressing on one or more selected locations in the structure may cause the overall shape of the structure to both shear and bend in three dimensions.

Likewise, if the modular structure comprises a chain or tessellated array that includes shear linkages and twist linkages, then pressing on one or more selected locations in the structure may cause the overall shape of the structure to both shear and twist in three dimensions.

Likewise, if the modular structure comprises a chain or tessellated array that includes SLUS linkages and bend linkages, then pressing on one or more selected locations in the structure may cause the overall shape of the structure to both uniformly scale and bend in three dimensions.

Likewise, if the modular structure comprises a chain or tessellated array that includes SLUS linkages and twist linkages, then pressing on one or more selected locations in the structure may cause the overall shape of the structure to both uniformly scale and twist in three dimensions.

Likewise, if the modular structure comprises a chain or tessellated array that includes SLUS linkages and shear linkages, then pressing on one or more selected locations in the structure may cause the overall shape of the structure to both shear and uniformly scale.

Prototype

The following five paragraphs describe a prototype of this invention.

In this prototype, each linkage is printed with a Stratasys® Connex500 3D printer. The rigid link is fabricated with rigid polymer (Vero™ Series) and the hinge comprises elastic polymer (Tango™ Series) or a rotary rigid hinge (Vero™ Series).

In this prototype, in some cases, rigid bars are printed with VeroBlack™ and the hinges are printed as elastic blocks with TangoBlack™, so that the whole grid structure appears identical at each position before compression.

In this prototype, the hinge diameter is at least 1 mm.

In a test of this prototype, each test unit was printed with VeroBlack™ Series material. The size of the unit was 3 by 3 cm. The wall thickness was 2 mm. The hinge tolerances were 0.05, 0.1, 0.15, 0.2 and 0.25 mm respectively.

In this prototype, the hinge tolerance is higher than 0.03 mm to avoid material fusing in the hinge during the print.

The prototype described in the preceding five paragraphs is a non-limiting example of this invention. This invention may be implemented in many different ways. For instance, the rigid links and joints may comprise other materials (e.g., any polymer or metal).

Tolerances

In illustrative implementations, the locations, distances and directions that are described herein are subject to manufacturing tolerances and to strain or displacement. Likewise, the shape of a physical object that is described herein may be subject to manufacturing tolerances and to strain or displacement.

In some cases, if a physical feature (e.g., a joint or hinge) is described herein as being in a particular location (e.g., at a vertex of a square), then the physical feature may be at the particular location or may be within a first threshold distance from the particular location. For instance, if the physical feature is part of a linkage, then the first threshold distance may be equal to one ten thousandth, one thousandth, one hundredth, or one tenth of the maximum dimension of the linkage. Or, for instance, the first threshold distance may be any specific distance that is greater than or equal to a micrometer and less than or equal to a centimeter.

In some cases, if a physical feature (e.g., a joint or hinge) is described herein as being at a particular distance from a specific object, then the physical feature may be at any distance (from the specific object) that is equal to the particular distance plus or minus a second threshold distance. For instance, if the physical feature is part of a linkage, then the second threshold distance may be any positive real number that is less than or equal to one ten thousandth, one thousandth, one hundredth, or one tenth of the maximum dimension of the linkage. Or, for instance, the second threshold distance may be any distance that is greater than or equal to 0.5 micrometers and less than or equal to 0.5 centimeters.

In some cases, if a first thing is described herein as being at a particular angle relative to a second thing, then the first thing may be within a range of angles relative to the second thing, where the range of angles consists of all angles that: (a) are greater than or equal to the particular angle minus a threshold angle; or (b) are less than or equal to the particular angle plus the threshold angle. For instance, the threshold angle may be one degree, two degrees, three degrees, four degrees, five degrees, or an angle that is greater than zero degrees and less than ten degrees, or an angle that is greater than zero degrees and less than fifteen degrees.

Definitions

The terms "a" and "an", when modifying a noun, do not imply that only one of the noun exists. For example, a statement that "an apple is hanging from a branch": (i) does not imply that only one apple is hanging from the branch; (ii) is true if one apple is hanging from the branch; and (iii) is true if multiple apples are hanging from the branch.

"Acute angle" means an angle that is greater than zero degrees and less than 90 degrees.

As used herein, an "angle" formed by a first arm, a second arm and a vertex means an angle formed by (a) a longitudinal axis of the first arm, (b) a longitudinal axis of the second arm, and (c) the vertex.

"Anisotropic scaling linkage" is defined above.

As used herein, an "arm" means a physical structure: (a) that has a length, width and height, the length being greater than the width and being greater than the height; and (b) has a longitudinal axis along the length.

"Basic linkage" is defined above.

"Bend linkage" is defined above.

"Bi-level uniform scaling linkage" or "BLUS linkage" is defined above.

The term "comprise" (and grammatical variations thereof) shall be construed as if followed by "without limitation". If A comprises B, then A includes B and may include other things.

As used herein, "configuration" of a linkage means a spatial arrangement of the rigid links of the linkage relative to each other. A "configuration" of a structure that comprises multiple linkages means a spatial arrangement of the multiple linkages and their component parts relative to each other.

"Defined Term" means a term or phrase that is set forth in quotation marks in this Definitions section.

To say that features "define" a specific shape means that a convex hull of the features has the specific shape. For instance, to say that rigid links "define" a square means that a convex hull of the rigid links is a square.

For an event to occur "during" a time period, it is not necessary that the event occur throughout the entire time period. For example, an event that occurs during only a portion of a given time period occurs "during" the given time period.

The term "e.g." means for example.

The fact that an "example" or multiple examples of something are given does not imply that they are the only instances of that thing. An example (or a group of examples) is merely a non-exhaustive and non-limiting illustration.

Unless the context clearly indicates otherwise: (1) a phrase that includes "a first" thing and "a second" thing does not imply an order of the two things (or that there are only two of the things); and (2) such a phrase is simply a way of identifying the two things, respectively, so that they each may be referred to later with specificity (e.g., by referring to "the first" thing and "the second" thing later). For example, unless the context clearly indicates otherwise, if an equation has a first term and a second term, then the equation may (or may not) have more than two terms, and the first term may occur before or after the second term in the equation. A phrase that includes a "third" thing, a "fourth" thing and so on shall be construed in like manner.

"For instance" means for example.

To say a "given" X is simply a way of identifying the X, such that the X may be referred to later with specificity. To say a "given" X does not create any implication regarding X. For example, to say a "given" X does not create any implication that X is a gift, assumption, or known fact.

"Herein" means in this document, including text, specification, claims, abstract, and drawings.

As used herein, "hinge" means a hinged joint.

As used herein: (1) "implementation" means an implementation of this invention; (2) "embodiment" means an embodiment of this invention; (3) "case" means an implementation of this invention; and (4) "use scenario" means a use scenario of this invention.

The term "include" (and grammatical variations thereof) shall be construed as if followed by "without limitation".

"Joint-matching anisotropic scaling linkage" or "JM anisotropic scaling linkage" is defined above.

"Joint-matching basic linkage" or "JM basic linkage" is defined above.

"Joint-matching bend linkage" or "JM bend linkage" is defined above.

"Joint-matching, bi-level uniform scaling linkage" or "JM BLUS linkage" is defined above.

"Joint-matching shear linkage" or "JM shear linkage" is defined above.

"Joint-matching, single-level uniform scaling linkage" or "JM SLUS linkage" is defined above.

"Joint-matching twist linkage" or "JM twist linkage" is defined above.

As used herein, "linkage" means a mechanical linkage.

As used herein, to say that a linkage is "L-shaped" means that the link comprises two arms that are attached to each other and are perpendicular to each other. In some cases, the two arms of an "L-shaped" link are of equal length. In other cases, the two arms of an "L-shaped" link are not of equal length.

The "maximum dimension" of an object means the longest Euclidian distance between any two points on the exterior surface of the object.

"Multi-linkage structure" means a structure that comprises multiple four-bar linkages.

"Obtuse angle" means an angle that is greater than 90 degrees and less than 180 degrees.

Unless the context clearly indicates otherwise, "or" means and/or. For example, A or B is true if A is true, or B is true, or both A and B are true. Also, for example, a calculation of A or B means a calculation of A, or a calculation of B, or a calculation of A and B.

A parenthesis is simply to make text easier to read, by indicating a grouping of words. A parenthesis does not mean that the parenthetical material is optional or may be ignored.

As used herein, to say that a linkage is "planar" means that a coordinate system may be selected such that movement of the links and joints of the linkage, relative to each other, occurs in only two Euclidean spatial dimensions of the coordinate system.

Unless the context clearly indicates otherwise, "plane" means a geometric plane.

As used herein, a "rigid" link means a link that has Young's modulus of at least 1 GPa.

As used herein, the term "set" does not include a group with no elements.

"Shear linkage" is defined above.

"Single-level uniform scaling linkage" or "SLUS linkage" is defined above.

Unless the context clearly indicates otherwise, "some" means one or more.

As used herein, a "subset" of a set consists of less than all the elements of the set.

"Substantial range of motion" is defined above.

The term "such as" means for example.

"2D" means two-dimensional.

"3D" means three-dimensional.

To say that a machine-readable medium is "transitory" means that the medium is a transitory signal, such as an electromagnetic wave.

"Twist linkage" is defined above.

"Uniform scaling linkage" means a linkage that is either: (a) a single-level uniform scaling linkage; or (b) a bi-level uniform scaling linkage.

Unless the context clearly indicates otherwise, whether a component of a four-bar linkage is "vertical" or "horizontal" is determined relative to a three-dimensional Euclidean coordinate system that is local to the four-bar linkage. However, whether a shape transformation by a multi-linkage structure is 2D or 3D is determined relative to a single, 3D Euclidean coordinate system that applies to at least the entire multi-linkage structure.

Unless the context clearly indicates otherwise: (a) "square" means a geometric square, rather than a physical object that is square; and (b) "rectangle" means a geometric rectangle, rather than a physical object that is rectangular. As used herein, to say that X is "inscribed" in Y describes a geometric relationship between X and Y, rather than a physical inscription.

Except to the extent that the context clearly requires otherwise, if steps in a method are described herein, then the method includes variations in which: (1) steps in the method occur in any order or sequence, including any order or sequence different than that described herein; (2) any step or steps in the method occur more than once; (3) any two steps occur the same number of times or a different number of times during the method; (4) any combination of steps in the method is done in parallel or serially; (5) any step in the method is performed iteratively; (6) a given step in the method is applied to the same thing each time that the given step occurs or is applied to a different thing each time that the given step occurs; (7) one or more steps occur simultaneously; or (8) the method includes other steps, in addition to the steps described herein.

Headings are included herein merely to facilitate a reader's navigation of this document. A heading for a section does not affect the meaning or scope of that section.

This Definitions section shall, in all cases, control over and override any other definition of the Defined Terms. The Applicant or Applicants are acting as his, her, its or their own lexicographer with respect to the Defined Terms. For example, the definitions of Defined Terms set forth in this Definitions section override common usage and any external dictionary. If a given term is explicitly or implicitly defined in this document, then that definition shall be controlling, and shall override any definition of the given term arising from any source (e.g., a dictionary or common usage) that is external to this document. If this document provides clarification regarding the meaning of a particular term, then that clarification shall, to the extent applicable, override any definition of the given term arising from any source (e.g., a dictionary or common usage) that is external to this document. Unless the context clearly indicates otherwise, any definition or clarification herein of a term or phrase applies to any grammatical variation of the term or phrase, taking into account the difference in grammatical form. For example, the grammatical variations include noun, verb, participle, adjective, and possessive forms, and different declensions, and different tenses.

Variations

This invention may be implemented in many different ways. Here are some non-limiting examples:

In some implementations, this invention is a physical structure comprising a set of multiple linkages, wherein: (a) each linkage in the set touches at least one other linkage in the set; and (b) the set consists of at least two types of four-bar linkages, which two types are in a group consisting of basic linkages, shear linkages, uniform scaling linkages, bend linkages, twist linkages, and anisotropic scaling linkages. In some cases, the structure is configured to undergo a three-dimensional shape transformation when force is applied to one or more parts of the structure. In some cases: (a) the structure is configured to undergo a three-dimensional shape transformation when force is applied to one or more parts of the structure; and (b) the shape transformation is reversible. In some cases, the set includes both basic linkages and bend linkages. In some cases: (a) the set includes both basic linkages and bend linkages; and (b) each bend linkage in the set touches at least one basic linkage in the set. In some cases: (a) the set includes both basic linkages and bend linkages; (b) each bend linkage in the set touches at least one basic linkage in the set; and (c) the structure is configured to undergo three-dimensional bending when force is applied to one or more parts of the structure. In some cases, the set includes both basic linkages and twist linkages. In some cases: (a) the set includes both basic linkages and twist linkages; and (b) each twist linkage in the set touches at least one basic linkage in the set. In some cases: (a) the set includes both basic linkages and twist linkages; (b) each twist linkage in the set touches at least one basic linkage in the set; and (c) the structure is configured to undergo three-dimensional twisting when force is applied to one or more parts of the structure. In some cases, the multiple linkages in the set are spatially arranged in a tessellated array. In some cases, each linkage in the set shares a joint in common with each of one or more other linkages in the set. In some cases, each linkage in the set shares, in common with each of one or more other linkages in the set: (a) a joint, (b) a part of a first rigid link; and (c) a part of a second rigid link. Each of the cases described above in this paragraph is an example of the physical structure described in the first sentence of this paragraph, and is also an example of an embodiment of this invention that may be combined with other embodiments of this invention.

In some implementations, this invention is a physical structure comprising a set of multiple linkages, wherein: (a) each linkage in the set touches at least one other linkage in the set; and (b) the set consists of at least one type of four-bar linkages, which at least one type is in a group consisting of shear linkages, single-level uniform scaling linkages, bi-level uniform scaling linkages, and anisotropic scaling linkages. In some cases, the set comprises a tessellated array of shear linkages. In some cases, the set comprises a tessellated array of single-level uniform scaling linkages. In some cases, the set comprises a tessellated array of bi-level uniform scaling linkages. In some cases, the set comprises a tessellated array of anisotropic scaling linkages. Each of the cases described above in this paragraph is an example of the physical structure described in the first sentence of this paragraph, and is also an example of an embodiment of this invention that may be combined with other embodiments of this invention.

In some implementations, this invention is a method comprising applying pressure to one or more parts of a structure and thereby causing the structure to undergo a three-dimensional shape transformation, wherein: (a) the structure comprises a set of multiple linkages; (b) each linkage in the set touches at least one other linkage in the set; and (c) the set consists of at least two types of four-bar linkages, which two types are in a group consisting of basic linkages, shear linkages, uniform scaling linkages, bend linkages, twist linkages, and anisotropic scaling linkages. In some cases: (a) the set includes basic linkages and bend linkages; and (b) the shape transformation comprises bending in three dimensions. In some cases: (a) the set includes basic linkages and twist linkages; and (b) the shape transformation comprises twisting in three dimensions. Each of the cases described above in this paragraph is an example of the method described in the first sentence of this paragraph, and is also an example of an embodiment of this invention that may be combined with other embodiments of this invention.

Each description herein (or in the Provisional) of any method, apparatus or system of this invention describes a non-limiting example of this invention. This invention is not limited to those examples, and may be implemented in other ways.

Each description herein (or in the Provisional) of any prototype of this invention describes a non-limiting example of this invention. This invention is not limited to those examples, and may be implemented in other ways.

Each description herein (or in the Provisional) of any implementation, embodiment or case of this invention (or any use scenario for this invention) describes a non-limiting example of this invention. This invention is not limited to those examples, and may be implemented in other ways.

Each Figure, diagram, schematic or drawing herein (or in the Provisional) that illustrates any feature of this invention shows a non-limiting example of this invention. This invention is not limited to those examples, and may be implemented in other ways.

The above description (including without limitation any attached drawings and figures) describes illustrative implementations of the invention. However, the invention may be implemented in other ways. The methods and apparatus which are described herein are merely illustrative applications of the principles of the invention. Other arrangements, methods, modifications, and substitutions by one of ordinary skill in the art are also within the scope of the present invention. Numerous modifications may be made by those skilled in the art without departing from the scope of the invention. Also, this invention includes without limitation each combination and permutation of one or more of the items (including any hardware, hardware components, methods, processes, steps, software, algorithms, features, and technology) that are described herein.

What is claimed:

1. A physical structure, comprising:
a set of multiple linkages, wherein:
at least one of the linkages in the set is coupled to at least one other linkage in the set; and
the set includes at least two types of four-bar linkages selected from a group consisting of:
basic linkages, shear linkages, uniform scaling linkages, bend linkages, twist linkages, and anisotropic scaling linkages,
wherein the at least one linkage in the set is coupled to said at least one other linkage in the set by a part of a first rigid link, a part of a second rigid link, the first and second rigid links each being at least part of one of bars from at least one of the respective coupled linkages.

2. The physical structure of claim 1, wherein the structure is configured to undergo a three-dimensional shape transformation when force is applied to one or more parts of the structure.

3. The physical structure of claim 1, wherein:
the structure is configured to undergo a three-dimensional shape transformation when force is applied to one or more parts of the structure; and
the shape transformation is reversible.

4. The physical structure of claim 1, wherein the set includes both basic linkages and bend linkages.

5. The physical structure of claim 1, wherein:
the set includes both basic linkages and bend linkages; and
each bend linkage in the set is coupled to at least one basic linkage in the set.

6. The physical structure of claim 1, wherein:
the set includes both basic linkages and bend linkages;
each bend linkage in the set is coupled to at least one basic linkage in the set; and;
the structure is configured to undergo three-dimensional bending when force is applied to one or more parts of the structure.

7. The physical structure of claim 1, wherein the set includes both basic linkages and twist linkages.

8. The physical structure of claim 1, wherein:
the set includes both basic linkages and twist linkages; and
each twist linkage in the set is coupled to at least one basic linkage in the set.

9. The physical structure of claim 1, wherein:
the set includes both basic linkages and twist linkages;
each twist linkage in the set is coupled to at least one basic linkage in the set;
and;
the structure is configured to undergo three-dimensional twisting when force is applied to one or more parts of the structure.

10. The physical structure of claim 1, wherein the multiple linkages in the set are spatially arranged in a tessellated array.

11. The physical structure of claim 1, wherein:
each linkage in the set shares a joint in common with said at least one other linkage in the set; and
each linkage in the set is coupled to at least one other linkage in the set at a rotational point the joint is included at the rotational point corresponding to said each linkage and said each of the one or more other linkages in the set.

12. The physical structure of claim 1, wherein the set comprises a tessellated array of single-level uniform scaling linkages.

13. The physical structure of claim 1, wherein the set comprises a tessellated array of bi-level uniform scaling linkages.

14. The physical structure of claim 1, wherein the set comprises a tessellated array of anisotropic scaling linkages.

* * * * *